(12) United States Patent
Hu

(10) Patent No.: US 11,611,509 B2
(45) Date of Patent: Mar. 21, 2023

(54) COMMUNICATION METHOD, COMMUNICATIONS DEVICE, AND COMMUNICATIONS SYSTEM

(71) Applicant: HUAWEI TECHNOLOGIES CO., LTD., Shenzhen (CN)

(72) Inventor: Chongyang Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/162,660

(22) Filed: Jan. 29, 2021

(65) Prior Publication Data

US 2021/0160182 A1 May 27, 2021

Related U.S. Application Data

(63) Continuation of application No. PCT/CN2019/097043, filed on Jul. 22, 2019.

(30) Foreign Application Priority Data

Aug. 1, 2018 (CN) .......................... 201810863428.7

(51) Int. Cl.
*H04L 45/745* (2022.01)
*H04L 12/46* (2006.01)
*H04L 45/00* (2022.01)

(52) U.S. Cl.
CPC ........ *H04L 45/745* (2013.01); *H04L 12/4641* (2013.01); *H04L 45/66* (2013.01)

(58) Field of Classification Search
CPC ... H04L 45/745; H04L 12/4641; H04L 45/66; H04L 45/18; H04L 45/24; H04L 45/28; H04L 45/50; H04L 12/4662; H04L 45/74
See application file for complete search history.

(56) References Cited

U.S. PATENT DOCUMENTS 9,838,310 B1 * 12/2017 Sajassi ................ H04L 61/6022
9,860,169 B1 * 1/2018 Ninan .................... H04L 45/02
(Continued)

FOREIGN PATENT DOCUMENTS

CN 103414634 A 11/2013
CN 104702476 A 6/2015
(Continued)

OTHER PUBLICATIONS

Chen Youjian, Research on Preventing Routing Loop in Dual-homing Network, Science and Technology Information, No. 04, 2015, with an English Abstract, total 3 pages.
(Continued)

*Primary Examiner* — Kibrom T Hailu
(74) *Attorney, Agent, or Firm* — Hauptman Ham, LLP

(57) ABSTRACT

A communications method includes receiving, by a first provider edge (PE) device, a data packet from a second PE device and avoiding, by the first PE device, sending the data packet to the second PE device in response to determining that a source address of the data packet is the same as an address of the second PE device in an entry. The source address of the data packet is the same as the address of the second PE in the entry stored in the first PE device. A customer edge (CE) device is multi-homed to the first PE device and the second PE device in an all-active mode. The CE device is connected to the first PE device through a first connection and the second PE device through a second
(Continued)

connection. The first connection and the second connection belonging to a same Ethernet segment.

20 Claims, 8 Drawing Sheets

(56) References Cited

U.S. PATENT DOCUMENTS

| | | | |
|---|---|---|---|
| 10,033,636 B1* | 7/2018 | Zhang | H04L 12/4633 |
| 2017/0019331 A1 | 1/2017 | Yong | |
| 2017/0201389 A1* | 7/2017 | Tiruveedhula | H04L 12/1886 |
| 2019/0052559 A1* | 2/2019 | Velayudhan | H04L 45/66 |
| 2019/0132241 A1* | 5/2019 | Vattem | H04L 12/4641 |
| 2019/0149462 A1* | 5/2019 | Semwal | H04L 12/4641 370/392 |

FOREIGN PATENT DOCUMENTS

| | | |
|---|---|---|
| CN | 105591868 A | 5/2016 |
| CN | 105791072 A | 7/2016 |
| CN | 105991432 A | 10/2016 |
| CN | 108183858 A | 6/2018 |
| CN | 108199945 A | 6/2018 |
| CN | 108199968 A | 6/2018 |
| CN | 108259303 A | 7/2018 |
| WO | 2011121673 A1 | 10/2011 |
| WO | 2018120798 A1 | 7/2018 |

OTHER PUBLICATIONS

International Search Report issued in corresponding International Application No. PCT/CN2019/097043, dated Oct. 24, 2019, pp. 1-9.
Chinese Office Action issued in corresponding Chinese Application No. 201810863428.7, dated Jul. 17, 2020, pp. 1-3.
Chinese Search Report issued in corresponding Chinese Application No. 201810863428.7, dated Jul. 8, 2020, pp. 1-2.
Hu Huawei Technologies C: "Enhance 1Pv6-Segment-Routing-basedEVPN VPWS All Active Usage; draft-hu-bess-srv6-vpn-bypass-sid-00.txt", Internet Draft: Network Working Group, Internet Engineeringtask Force, IETF; Standardworkingdraft, Internetsociety (ISOC) 4, Rue Des Falaises C, Jul. 2, 2018, XP015127396, 9 Pages.
A Sajassi: "RFC 7432—BGP MPLS-Based Ethernet VPN", IETF, Feb. 2015, XP055303848, URL:https://tools. ietf.org/html/rfc7432, 56 Pages.
Extended European Search Report issued in corresponding European Application No. 19844091.9, dated Aug. 4, 2021, pp. 1-16, European Patent Office, Munich, Germany.
Japanese Office Action issued in corresponding Japanese Application No. 2021-505247, dated Apr. 11, 2022, pp. 1-9.
H. Chen et al.,"SRv6 SID Bypass Functions,draft-chen-bess-srv6-service-bypass-sid-00",Network Working Group, Internet-Draft, Jul. 13, 2020, total 9 pages.

* cited by examiner

1100

COMMUNICATION METHOD, COMMUNICATIONS DEVICE, AND COMMUNICATIONS SYSTEM

CROSS-REFERENCE TO RELATED APPLICATIONS

This application a continuation of International Application No. PCT/CN2019/097043, filed on Jul. 22, 2019, which claims priority to Chinese Patent Application No. 201810863428.7, filed on Aug. 1, 2018 The disclosures of the aforementioned applications are hereby incorporated by reference in their entireties.

TECHNICAL FIELD

This application relates to the communications field, and in particular, to a communication method, a communications device, and a communications system.

BACKGROUND

In an Ethernet virtual private network (EVPN), when provider edge (PE) devices send data packets, a traffic loop may be easily formed, the loop process causes waste of network resources and affects performance of the PE devices.

SUMMARY

This application provides a communication method and a provider edge PE device, to prevent a loop from being termed when traffic is forwarded, and avoid waste of network resources.

According to a first aspect, a communication method is provided. The method includes: A first provider edge PE device receives a message sent by a second PE device, where the message includes a first Ethernet segment identifier ESI and an address of the second PE device, and the first ESI is used to identify an Ethernet segment to which a connection between the second PE device and a customer edge CE device belongs; the first PE device determines that the first ESI is the same as a second ESI stored in the first PE device, where the second ESI is used to identify an Ethernet segment to which a connection between the first PE device and the CE device belongs; the first PE device generates an entry in response to that the first PE device determines that the first ESI is the same as the second ESI, where the entry includes the address of the second PE device; the first PE device receives a data packet sent by the second PE device;

the first PE device determines that a source address of the data packet is the same as the address of the second PE device in the entry; and the first PE device avoids sending the data packet to the second PE device in response to that the first PE device determines that the source address of the data packet is the same as the address of the second PE device in the entry.

In the prior art, the first PE device does not store an entry including the address of the second PE device, and when the second PE device sends a data packet to the first PE device, a source address included in the data packet is not the address of the second PE device. Consequently, when the first PE device receives the data packet, the data packet may be sent back to the second PE device, causing a traffic loop. In the embodiment of this application, when the first PE device receives the data packet, based on the entry that includes the address of the second PE device and that is stored in the first device and the source address included in the data packet, the first PE device can avoid sending the data packet to the second PE device, so that no traffic loop is formed, thereby avoiding waste of network resources, and avoiding affecting performance of the PE devices.

With reference to the first aspect, in some implementations of the first aspect, before the first PE device determines that the source address of the data packet is the same as the address of the second PE device, the method further includes: The first PE device determines that an interface used by the first PE device to connect to the CE device is faulty.

In this case, after the first PE device determines that the interface used by the first PE device to connect to the CE device is faulty, if the data packet is sent to the CE through the second PE device, a loop may be formed. Therefore, the first PE device determines whether the source address of the data packet is the same as the address of the second PE device, so that no loop is formed. If the first PE device determines that the interface used by the first PE device to connect to the CE device is normal, the first PE device may send the data packet through the interface used by the first PE device to connect to the CE device, and no traffic loop is formed. Therefore, the first PE device does not need to determine whether the source address of the data packet is the same as the address of the second PE device, so that efficiency of sending the data packet by the first PE device during communication can be improved.

With reference to the first aspect, in some implementations of the first aspect, the method further includes: The first PE device avoids sending the data packet to the CE device in response to that the first PE device determines that a source address of the data packet is the same as the address of the second PE device in the entry.

In the prior art, there is a scenario in which the data packet is sent by the CE device to the second PE device, and the second PE device sends the data packet to the first PE device. When the second PE device sends the data packet to the first PE device, the source address included in the data packet is not the address of the second PE device. Consequently, when receiving the data packet, the first PE device may send the data packet to the CE device, causing a traffic loop. In this embodiment of this application, when receiving the data packet, the first PE device can determine that the source address of the data packet is the same as the address of the second PE device in the entry based on the entry that includes the address of the second PE device and that is stored in the first device and the source address included in the data packet, to avoid sending the data packet to the CE device, avoid a traffic loop, avoid waste of network resources, and avoid affecting performance of the PE devices.

With reference to the first aspect, in some implementations of the first aspect, the first PE device stores interface information, the second ESI stored in the first PE device is included in the interface information, the interface information further includes an interface identifier, the interface identifier is used to identify an interface used by the first PE device to connect to the CE device, and the entry further includes the interface identifier. That the first PE device generates an entry in response to that the first PE device determines that the first ESI is the same as the second ESI includes: The first PE device determines the interface identifier in the interface information based on the second ESI.

That the first PE device avoids sending the data packet to the CE device includes:

The first PE device determines the interface identifier in the entry based on the entry and the source address of the data packet; and the first PE device avoids sending the data packet to the interface that is used by the first PE device to connect to the CE device and that is identified by the interface identifier.

In this case, when the first ESI is the same as the second ESI, the entry generated by the first PE device includes the interface identifier of the interface used by the first PE device to connect to the CE device. Therefore, the first PE device avoids sending the data packet to the interface used by the first PE device to connect to the CE device and that is identified by the interface identifier, so that the first PE device avoids sending the data packet to the CE device.

With reference to the first aspect, in some implementations of the first aspect, the method is applied to an Ethernet virtual private network EVPN that is based on Internet Protocol version 6 segment routing SRv6, and the message is an Ethernet auto-discovery route with an ESI label extended community attribute.

The method is applied to the Ethernet virtual private network EVPN based on the Internet Protocol version 6 segment routing SRv6, so that no traffic loop is formed in the Ethernet virtual private network EVPN based on the Internet Protocol version 6 segment routing SRv6, thereby avoiding waste of network resources and avoiding affecting the performance of the PE devices.

According to a second aspect, a communications device is provided, where the communications device is a first provider edge PE device, including:

a receiving module, configured to receive a message sent by a second PE device, where the message includes a first Ethernet segment identifier ESI and an address of the second PE device, and the first ESI is used to identify an Ethernet segment to which a connection between the second PE device and a customer edge CE device belongs;

a determining module, configured to determine that the first ESI is the same as a second ESI stored in the first PE device, where the second ESI is used to identify an Ethernet segment to which a connection between the first PE device and the CE device belongs; and a processing module, configured to generate an entry in response to determining that the first ESI is the same as the second ESI, where the entry includes the address of the second PE device.

The receiving module is further configured to receive a data packet sent by the second PE device.

The determining module is further configured to determine that a source address of the data packet is the same as the address of the second PE device in the entry.

The processing module is further configured to avoid sending the data packet to the second PE device in response to determining that the source address of the data packet is the same as the address of the second PE device in the entry.

With reference to the second aspect, in some implementations of the second aspect, the determining module is further configured to determine that an interface used by the first PE device to connect to the CE device is faulty before the determining module determines that the source address of the data packet is the same as the address of the second PE device.

With reference to the second aspect, in some implementations of the second aspect, the processing module is further configured to avoid sending the data packet to the CE device in response to determining that the source address of the data packet is the same as the address of the second PE device in the entry.

With reference to the second aspect, in some implementations of the second aspect, the first PE device stores interface information, the second ESI stored in the first PE device is included in the interface information, the interface information further includes an interface identifier, the interface identifier is used to identify an interface used by the first PE device to connect to the CE device, and the entry further includes the interface identifier. The processing module is specifically configured to determine the interface identifier in the interface information based on the second ESI in response to determining that the first ESI is the same as the second ESI, to generate the entry. The processing module is specifically configured to determine the interface identifier in the entry based on the entry and the source address of the data packet, and avoid sending the data packet to the interface that is used by the first PE device to connect to the CE device and that is identified by the interface identifier.

With reference to the second aspect, in some implementations of the second aspect, the communications device is applied to an Ethernet virtual private network EVPN that is based on Internet Protocol version 6 segment routing SRv6, and the message is an Ethernet auto-discovery route with an ESI label extended community attribute.

According to a third aspect, a communications device is provided, where the communications device is a first provider edge PE device, including:

a memory, configured to store a second Ethernet segment identifier ESI, where the second ESI is used to identify an Ethernet segment to which a connection between the first PE device and a customer edge CE device belongs; and a processor, configured to receive a message sent by a second PE device, where the message includes a first Ethernet segment identifier ESI and an address of the second PE device, and the first ESI is used to identify an Ethernet segment to which a connection between the second PE device and a customer edge CE device belongs.

The processor is further configured to determine that the first ESI is the same as the second ESI.

The processor is further configured to generate an entry in response to determining that the first ESI is the same as the second ESI, and the entry includes the address of the second PE device.

The processor is further configured to receive a data packet sent by the second PE device.

The processor is further configured to determine that a source address of the data packet is the same as the address of the second PE device in the entry.

The processor is further configured to avoid sending the data packet to the second PE device in response to determining that the source address of the data packet is the same as the address of the second PE device in the entry.

With reference to the third aspect, in some implementations of the third aspect, the communications device further includes an interface. The interface is configured to connect to the CE device. The processor is further configured to determine that the interface used by the first PE device to connect to the CE device is faulty before the processor determines that the source address of the data packet is the same as the address of the second PE device.

With reference to the third aspect, in some implementations of the third aspect, the processor is further configured to avoid sending the data packet to the CE device in response to determining that the source address of the data packet is the same as an address of the second PE device in the entry.

With reference to the third aspect, in some implementations of the third aspect, the memory stores interface information, the second ESI stored in the memory is included in the interface information, the interface information further includes an interface identifier, the interface identifier is used to identify an interface used by the first PE device to connect to the CE device, and the entry further includes the interface identifier. The processor is specifically configured to determine the interface identifier in the interface information based on the second ESI to generate the entry. The processor is specifically configured to: determine, by the first PE device, the interface identifier in the entry based on the entry and the source address of the data packet; and avoid sending, by the first PE device, the data packet to the interface that is used by the first PE device to connect to the CE device and that is identified by the interface identifier.

With reference to the third aspect, in some implementations of the third aspect, the communications device is applied to an Ethernet virtual private network EVPN that is based on Internet Protocol version 6 segment routing SRv6, and the message is an Ethernet auto-discovery route with an ESI label extended community attribute.

According to a fourth aspect, a communications system is provided, where the communications system includes a first provider edge PE device and a second PE device.

The first PE device is configured to:

receive a message sent by the second PE device, where the message includes a first Ethernet segment identifier ESI and an address of the second PE device, and the first ESI is used to identify an Ethernet segment to which a connection between the second PE device and a customer edge CE device belongs;

determine that the first ESI is the same as a second ESI stored in the first PE device, where the second ESI is used to identify an Ethernet segment to which a connection between the first PE device and the CE device belongs:

generate an entry in response to that the first PE device determines that the first ESI is the same as the second ESI, where the entry includes the address of the second PE device;

receive a data packet sent by the second PE device;

determine that a source address of the data packet is the same as the address of the second PE device in the entry; and avoid sending the data packet to the second PE device in response to that the first PE device determines that the source address of the data packet is the same as the address of the second PE device in the entry.

The second PE device is configured to:

send the message to the first PE device; and send the data packet to the first PE device.

With reference to the fourth aspect, in some implementations of the fourth aspect, the first PE device is further configured to: before determining that the source address of the data packet is the same as the address of the second PE device, determining that an interface used by the first PE device to connect to the CE device is faulty.

With reference to the fourth aspect, in some implementations of the fourth aspect, the second PE device is further configured to: before sending the data packet to the first PE device, determine that an interface used by the second PE device to connect to the CE device is faulty.

Therefore, when both the interface used by the second PE device to connect to the CE device and the interface used by the first PE device to connect to the CE device are faulty, a continuous traffic loop between the first PE device and the second PE device is avoided.

With reference to the fourth aspect, in some implementations of the fourth aspect, the first PE device is further configured to avoid sending the data packet to the CE device in response to that the first PE device determines that the source address of the data packet is the same as the address of the second PE device in the entry.

With reference to the fourth aspect, in some implementations of the fourth aspect, the first PE device stores interface information, the second ESI stored in the first PE device is included in the interface information, the interface information further includes an interface identifier, the interface identifier is used to identify an interface used by the first PE device to connect to the CE device, and the entry further includes the interface identifier, That the first PE device generates an entry in response to that the first PE device determines that the first ESI is the same as the second ESI includes: The first PE device determines the interface identifier in the interface information based on the second ESI, to generate the entry.

That the first PE device avoids sending the data packet to the CE device includes:

The first PE device determines the interface identifier in the entry based on the entry and the source address of the data packet; and the first PE device avoids sending the data packet to the interface that is used by the first PE device to connect to the CE device and that is identified by the interface identifier.

With reference to the fourth aspect, in some implementations of the fourth aspect, the communications system is applied to an Ethernet virtual private network EVPN that is based on Internet Protocol version 6 segment routing SRv6, and the message is an Ethernet auto-discovery route with an ESI label extended community attribute.

According to a fifth aspect, a communications device is provided, including a processor and a memory, where the memory is configured to store an instruction, and the processor is configured to execute the instruction, to enable the communications device to perform the method according to the first aspect or any optional implementation of the first aspect.

According to a sixth aspect, a computer-readable storage medium is provided, where the computer-readable storage medium stores an instruction, and when the instruction is executed, the communications device is enabled to perform the method according to the first aspect or any optional implementation of the first aspect.

According to a seventh aspect, a computer program product is provided, where the computer program product includes an instruction, and when the instruction is executed by a communications device, the communications device is enabled to perform the method according to the first aspect or any optional implementation of the first aspect.

DESCRIPTION OF EMBODIMENTS

Figure 1:
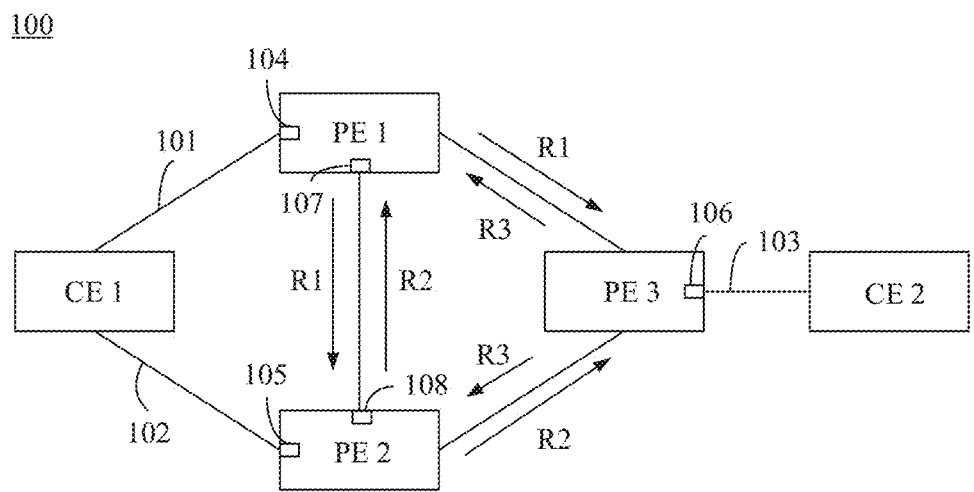
FIG. 1 is a schematic diagram of an SRv6 EVPN dual-active scenario according to an embodiment of this application.

The following describes technical solutions of this application with reference to accompanying drawings.

For the sake of clarity, terms used in this application are first explained.

In Internet Protocol version 6 segment routing (SRv6), a segment routing header (SRH) is inserted into an IPv6 packet, where the SRH includes an IPv6 address list and an index pointing to the IPv6 address list; and a segment endpoint node on a data packet forwarding path searches for IPv6 addresses one by one based on the index, and updates a destination address of the data packet with a found IPv6 address for forwarding. The destination address of the data packet is an IPv6 address, and the IPv6 address in SRv6 can be used as a segment identifier (SID).

An SRv6 EVPN refers to an EVPN based on SRv6.

A virtual private wire service (VMS) is a point-to-point layer 2 virtual private network (VPN) service. The EVPN VPWS is a VMS implemented in the EVPN. The EVPN VPWS can provide a single-active multi-horning or all-active multi-homing capability.

An attachment circuit (AC) is a physical or logical link used to connect a CE device and a PE device.

An Ethernet virtual private line (EVPL) is used to provide a point-to-point Ethernet connection between a pair of ACs. The VPWS is implemented based on the EVPL.

Ethernet segment (ES): If a CE is multi-homed to two or more PEs, a group of Ethernet links (for example, a plurality of ACs) used by the CE to access the PEs belong to an ES. An identifier used to uniquely identify the ES is an Ethernet segment identifier (ESI).

An Ethernet tag identifier (Ethernet Tag ID) is used to identify a particular broadcast domain.

A broadcast domain (BD) corresponds to a virtual local area network (VLAN).

A local interface refers to an interface used by a PE device to connect to a CE device or an AC without using another PE. For example, in FIG. 1, interfaces 104 and 105 are local interfaces, while interfaces 107 and 108 are non-local interfaces.

In this application, an interface used by a PE device to connect to a CE device or an AC refers to an interface used by the PE device to connect to the CE device or the AC without using another PE device. In this application, an interface used by a PE device to send a data packet to another PE device or a CE device may also be referred to as an outbound interface, and a local interface on the PE device that is used to send a data packet to the CE device or the AC may also be referred to as a local outbound interface. In this application, the interface may be a physical port or a logical port on a physical port.

The EVPN provides an all-active mode. In all-active mode, when a device is multi-homed to a plurality of provider edge (provider edge, PE) devices, the plurality of PE devices can all forward traffic to the device. When the plurality of PE devices include two PE devices, the all-active mode may also be referred to as dual-active mode, and "multi-homed" may also be referred to as "dual-homed".

For a clearer understanding of this application, this application is further described below based on different scenarios of the SRv6 EVPN. It should be understood that this application may be applied to the scenario of the SRv6 EVPN, and certainly may also be applied to another communication scenario. This is not limited in this embodiment of this application.

FIG. 1 is a schematic diagram of an SRv6 EVPN dual-active scenario according to an embodiment of this application. The network shown in FIG. 1 may provide a virtual private wire service VPWS. The network shown in FIG. 1 includes CE devices CE 1 and CE 2, and PE devices PE 1, PE 2, and PE 3. PE 1, PE 2, and PE 3 are connected to CE 1, CE 1, and CE 2 through attachment circuits AC 101, AC 102, and AC 103, respectively; and PE 1, PE 2, and PE 3 are connected to AC 101, AC 102, and AC 103 through interfaces 104, 105, and 106, respectively. The interfaces 104, 105, and 106 are all local interfaces, and interfaces 107 and 108 are non-local interfaces. PE 1 is connected to PE 2 through the interface 107, and PE 2 is connected to PE 1 through the interface 108. AC 101 and AC 102 belong to the same Ethernet segment, and an identifier of the Ethernet segment may be "ESI 1". AC 103 belongs to another Ethernet segment, and an identifier of the another Ethernet segment may be "ESI 2". In an example, PE 1, PE 2, and PE 3 are configured as follows:

PE 1: An ESI attribute value of the interface 104 is "ESI 1"; values of local and peer Ethernet Tag IDs associated with the interface 104 are "1" and "2", respectively; and an SID associated with the EVPL is "1::1". For example, a specific configuration process is as follows: The ESI attribute value of the interface 104 is configured to be "ESI 1"; an EVPL processing module associated with the interface 104 is configured to be "EVPL 1"; values of local and peer Ethernet Tag IDs associated with EVPL 1 are configured to be "1" and "2", respectively; an SID associated with EVPL 1 is configured to be "1::1"; and an SID associated with the processing module EVPL 1 used to process EVPL-related data on PE 1 is configured to be "1::1", which is equivalent to configuring an SID associated with an EVPL service on PE 1 to be "1::1", in other words, the SID associated with the EVPL service on PE 1 is configured to be "1::1".

PE 2: An ESI attribute value of the interface 105 is "ESI 1"; values of local and peer Ethernet Tag IDs associated with the interface 105 are "1" and "2", respectively; and an SID associated with the EVPL is "2::1". For example, a specific configuration process is as follows: The ESI attribute value of the interface 105 is configured to be "ESI 1"; an EVPL processing module associated with the interface 105 is configured to be "EVPL 2"; values of local and peer Ethernet Tag IDs associated with EVPL 2 are configured to be "1" and "2", respectively; an SID associated with EVPL 2 is configured to be "2::1"; and an SID associated with the processing module EVPL 1 used to process EVPL-related data on PE 2 is configured to be "2::1", which is equivalent to configuring an SID associated with an EVPL service on PE 2 to be "2::1", in other words, the SID associated with the EVPL service on PE 2 is configured to be "2::1".

PE 3: An ESI attribute value of the interface 106 is "ESI 2"; values of local and peer Ethernet Tag IDs associated with the interface 106 are "2" and "1", respectively; and an SID associated with the EVPL is "3::1". For example, a specific configuration process is as follows: The ESI attribute value of the interface 106 is configured to be "ESI 2"; an EVPL processing module associated with the interface 106 is configured to be "EVPL 3"; values of local and peer Ethernet Tag IDs associated with EVPL 3 are configured to be "2" and "1", respectively; an SID associated with EVPL 3 is configured to be "3::1"; and an SID associated with the processing module EVPL 3 used to process EVPL-related data on PE 3 is configured to be "3::1", which is equivalent to configuring an SID associated with an EVPL service on PE 3 to be "3::1", in other words, the SID associated with the EVPL service on PE 3 is configured to be "3::1".

In this scenario, to provide the VPWS and dual-active mode, PE 1, PE 2, and PE 3 send routing messages to each other. The routing message may be a border gateway protocol (BGP) message. The BGP message may include an Ethernet auto-discovery route (Ethernet AD route) and an SRv6-VPN SID attribute. The Ethernet auto-discovery route (AD route for short) may include an ESI field and an Ethernet Tag ID field. The SRv6-VPN SID attribute is an attribute a type/length/value (TLV) format, including a type field, a length field, and a value field, where the type may be "1" or "2". In the following scenario shown in FIG. 2, the value in the SRv6-VPN SID attribute in which the type is "2" is referred to as the EVPL attribute value, and the EVPL attribute value may be used to notify the peer device of the SID that is associated with the EVPL and that is configured on the local device. For description of the Ethernet auto-discovery route, reference may be made to request for comments (RFC) 7432 issued by the Internet engineering task force (Internet Engineering Task Force, IETF). For description of an SRv6-VPN SID, reference may be made to the IETF draft "BGP Signaling of IPv6-Segment-Routing-based VPN Networks, draft-dawra-idr-srv6-vpn-03".

In an example, PE 1 generates an AD route E1, where the value of the ESI field in E1 is the ESI attribute value "ESI 1" of the interface 104 that is configured on PE 1, and the value of the Ethernet Tag ID field is the local Ethernet Tag ID value "1" associated with the interface 104 that is configured on PE 1; and PE 1 sends a routing message R1 carrying E1 and an EVPL attribute value to PE 2 and PE 3, where the EVPL, attribute value is "1::1", and the EVPL attribute value can be used to notify PE 2 and PE 3 that the SID value associated with EVPL on PE 1 is "1::1". Similarly, PE 2 generates an AD route E2, where the value of the ESI field in E2 is the ESI attribute value "ESI 1" of the interface 105 that is configured on PE 2, and the value of the Ethernet Tag ID field is the local Ethernet Tag ID value "1" associated with the interface 105 that is configured on PE 2; and PE 2 sends a routing message R2 carrying E2 and an EVPL attribute value to PE 1 and PE 3, where the EVPL attribute value is "2:1". PE 3 generates an AD route E3, where the value of the ESI field in E 3 is the ESI attribute value "ESI 2" of the interface 106 that is configured on PE 3, and the value of the Ethernet Tag ID field is the local Ethernet Tag ID value "2" associated with the interface 106 that is configured on PE 3; and PE 3 sends a routing message R3 carrying E 3 and an EVPL attribute value to PE 1 and PE 2, where the EVPL attribute value is "3::1".

After receiving the routing message R2 sent by PE 2, PE 1 can determine that the value of the ESI field in the routing message R2 is the same as the value of the ESI field in the AD route E1 that is generated by PE 1, and both values are "ESI 1"; and both PE 1 and PE 2 belong to the same Ethernet segment. Therefore, it can be determined that PE 2 is a backup device of PE 1 and that a repaired path can be determined based on the routing message R2, in other words, PE 1 can determine that the repaired path from PE 1 to CE 1 is from PE 1 to CE 1 through PE 2. Therefore, there are two paths from PE 1 to CE 1: One is a main path to CE 1 through the local interface 104, and the other is a repaired path to CE 1 through the interface 107 and PE 2. When the interface 104 used by PE 1 to connect to CE 1 is faulty, a data packet may be sent to PE 2 through the interface 107, so that the data packet can be sent to CE 1 through PE 2 for implement fast reroute (FRR). In this application, the repaired path may also be referred to as a bypass path. Similarly, after receiving the routing message R1 sent by PE 1, PE 2 can determine that PE 1 is a backup device of PE 2 and can determine a repaired path based on the routing message R1, in other words, PE 2 can determine that the repaired path from PE 2 to CE 1 is from PE 2 to CE 1 through PE 1. Therefore, there are two paths from PE 2 to CE 1: One is a main path to CE 1 through the local interface 105, and the other is a repaired path to CE 1 through the interface 108 and PE 1. When the interface 105 used by PE 2 to connect to CE 1 is faulty, a data packet may be sent to PE 1 through the interface 108, so that the data packet is sent to CE 1 through PE 1 to implement FRR.

After receiving the routing message R2 sent by PE 2, PE 3 determines that the peer Ethernet Tag ID value "1" configured by PE 3 is the same as the Ethernet Tag ID value "1" in the routing message R2. Similarly, after receiving the routing message R3 sent by PE 3, PE 2 determines that the peer Ethernet Tag ID value "2" configured by PE 2 is the same as the Ethernet Tag ID value "2" in the routing message R3. In other words, the local Ethernet Tag ID and peer Ethernet Tag ID of PE 2 are the same as the peer Ethernet Tag ID and local Ethernet Tag ID of PE 3, respectively. Then, an EVPL is established between PE 2 and PE 3, and both ends of the EVPL are connected to the attachment circuits AC 202 and AC 203, respectively, so that a data packet sent by CE 2 can reach CE 1 through the AC 103, the EVPL, and the AC 102. PE 3 may obtain the EVPL attribute value "2::1" from the routing message R2. After an EVPL between PE 2 and PE 3 is established, when a data packet on PE 3 needs to be sent to CE 1, PE 3 may send the data packet to PE 2 by using "2::1" as a destination address of the data packet, so that the data packet is sent to PE 2 through the EVPL between PE 2 and PE 3. In this application, the destination address of the data packet may be a destination address in an IPv6 header of the data packet, the destination address is an IPv6 address, and the IPv6 address in SRv6 may be a segment identifier SID. After receiving the data packet, PE 2 identifies that the destination address "2::1" of the data packet is the SID value associated with the EVPL, and performs operations associated with the SID value "2::1" associated with the EVPL. The associated operations include: determining an entry y2 associated with the SID value "2::1" on PE 2, where the entry y2 includes the SID value "2::1" an identifier of the local interface 105, and an identifier of the interface 108; determining whether the local interface 105 in the entry y2 is faulty; sending the data packet to CF 1 through the local interface 105 when the local interface 105 is not faulty; and sending the data packet to PE 1 through the interface 108 when the local interface 105 is faulty.

An SID value in SRv6 may be associated with a series of instructions where the series of instructions may also be referred to as functions. In this application, a function may also be referred to as an operation, and an operation associated with each SID value on each PE device may be pre-configured. For example, to implement the operation of performing an operation associated with the SID value "1::1" on PE 1, an entry y1 is pre-saved on PE 1, where the entry y1 includes the SID value "1::1" and all interfaces on PE 1 that can be used to send the data packet to CE 1, including the local interface 104 and the interface 107, where the interface 107 is used to send the data packet to PE 2 to implement FRR. For another example, to implement the operation of performing an operation associated with the SID value "2::1" on PE 2, an entry y2 is pre-saved on PE 2, where the entry y2 includes the SID value "2::1" and all interfaces on PE 2 that can be used to send the data packet to CE 1, including the local interface 105 and the interface 108, where the interface 108 is used to send the data packet to PE 1 to implement FRR. The IETF draft "SRv6 Network Programming, draft-filsfils-spring-srv6-network-programming-04" has defined functions (Functions) associated with an SID. For operations associated with an SID value associated with the EVPL in this scenario, reference may be made to the functions of End.DX2 described in section 4.4 of the draft. The functions of End.DX2 include forwarding data packets through an outbound interface associated with an SID. According to the functions of End.DX2, the functions associated with the SID value "1::1" on PE 1 include sending data packets through the local interface 104 or the interface 107, and the functions associated with the SID value "2::1" on PE 2 include sending data packets through the local interface 105 or the interface 108.

Similarly, PE 3 receives the routing message R1 sent by PE 1, and PE 1 receives the routing message R3 sent by PE 3. The local Ethernet Tag ID and the peer Ethernet Tag ID of PE 1 are the same as the peer Ethernet Tag ID and the local Ethernet Tag ID of PE 3, respectively. Then, an EVPL is established between PE 1 and PE 3 and both ends of the EVPL are connected to the attachment circuits AC 101 and AC 103, respectively, so that a data packet sent by CE 2 can reach CE 1 through the AC 103, the EVPL, and the AC 101. PE 3 may obtain the EVPL attribute value "1::1" from the routing message R1. After an EVPL between PE 1 and PE 3 is established, when a data packet on PE 3 needs to be sent to CE 1, PE 3 may send the data packet to PE 1 by using "1::1" as a destination address of the data packet, so that the data packet is sent to PE 1 through the EVPL between PE 1 and PE 3. After receiving the data packet, PE 1 identifies that the destination address "1::1" of the data packet is the SID value associated with the EVPL, and performs operations associated with the SID value "1::1" associated with the EVPL. The associated operations include: determining an entry y1 associated with the SID value "1::1" on PE 1, where the entry y1 includes the SID value "1::1", an identifier of the local interface 104, and an identifier of the interface 107; determining whether the local interface 104 in the entry y1 is faulty; sending the data packet to CE 1 through the local interface 104 when the local interface 104 is not faulty; and sending the data packet to PE 2 through the interface 107 when the local interface 104 is faulty.

In the foregoing scenario, when PE 1 and PE 2 determine a repaired path based on the routing message sent by the peer device to implement FRR, PE 1 and PE 2 determine the repaired path based on an EVPL attribute value, namely, a value associated with the EVPL on the peer device. Then, when PE 2 receives a data packet to be sent to CE 1 sent by PE 3, if PE 2 determines that the local interface 105 is faulty, PE 2 may send the data packet to be sent to CE 1 to PE 1 through the interface 108 by using the value "1::1" associated with the EVPL on PE 1 as a destination address of the data packet, to attempt to trigger PE 1 to forward the data packet to the local interface 104 to implement FRR. After receiving the data packet, PE 1 performs operations associated with the SID value "1::1" associated with the EVPL, including: determining an entry y1 associated with the SID value "1::1"; determining, based on the entry y1, whether the local interface 104 of PE 1 is faulty; and sending the data packet to CE 1 through the local interface 104 to complete forwarding to implement FRR when the local interface 104 is not faulty. However, when the local interface 104 is also faulty, if PE 1 also uses the value "2::1" associated with the EVPL on PE 2 as the destination address of the data packet to send the data packet to PE 2, to attempt to trigger PE 2 to forward the data packet to the local interface 105, PE 2 changes the destination address of the data packet back to "1::1", and returns the data packet with the destination address of "1::1" to PE 1. Consequently, a data packet transmission loop is formed. When PE 3 receives a route revocation notification, a new loop will not occur only when no new data packet is sent to PE 2. An existing loop can be removed only when PE 1 or PE 2 receives the route revocation notification and revokes the route to the peer device. The loop problem may cause waste of network resources and affect performance of the PE devices.

To resolve the loop problem, before PE 1 and PE 2 start a normal data service, PE 1 and PE 2 send a routing message to each other. The routing message may be a border gateway protocol (BGP) message, and the BGP message may be an Ethernet auto-discovery route with an ESI label extended community attribute. The Ethernet auto-discovery route with the ESI label extended community attribute (per-ES Ethernet Auto-Discovery routes, ES AD) includes an ESI field and an address of the provider edge device.

It should be understood that the ES AD route may be sent concurrently with an Ethernet auto-discovery route without an ESI label extended community attribute, or the ES AD route may be sent before or after an Ethernet auto-discovery route without an ESI label extended community attribute is sent.

Figure 2:
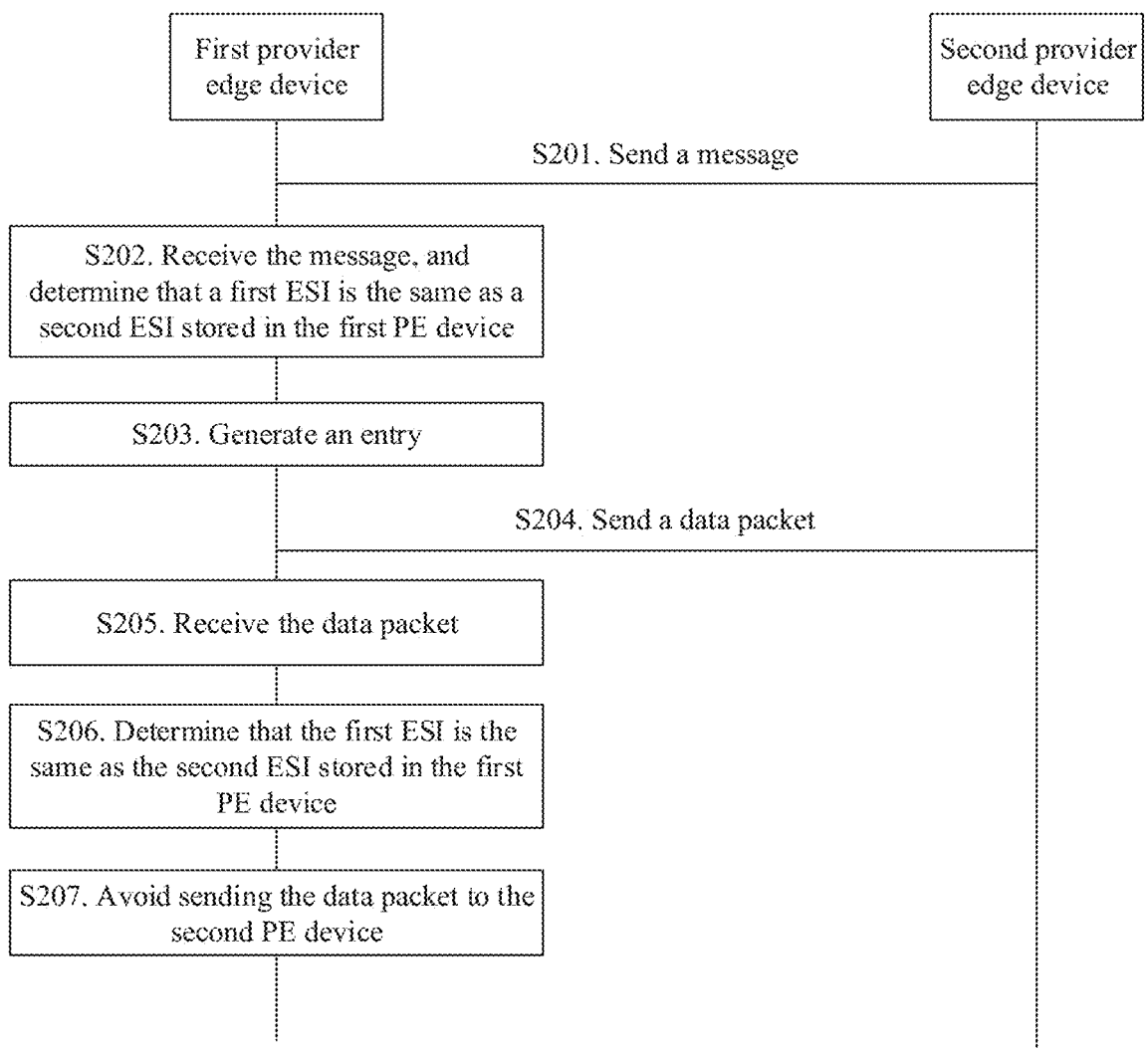
FIG. 2 is a schematic flowchart of a communication method according to this application.

A communication method 200 provided in this application is described in detail below with reference to FIG. 2. The method 200 may be applied to the scenario shown in FIG. 2, and certainly may also be applied to another communication scenario. This is not limited in this embodiment of this application. The method 200 includes the following:

S201. PE 2 sends a message to PE 1.

The message may be a BGP message, for example, the foregoing ES AD. The message includes a first Ethernet segment identifier ESI and an address of PE 2. The address of PE 2 may be an IPv6 address of PE 2. For example, the address of PE 2 may be an address used by PE 2 to establish a BGP peer relationship with PE 1, for example, "2::100". The first ESI may identify an Ethernet segment to which a connection between PE 2 and CE 1 belongs. The first ESI is, for example, ESI 1; and the connection between PE 2 and CE 1 is, for example, AC 102. The Ethernet segment further includes a connection between PE 1 and CE 1, for example, AC 101.

S202. PE 1 receives the message sent by PE 2, and PE 1 determines that the first ESI is the same as a second ESI stored in PE 1.

The second ESI may identify the Ethernet segment to which a connection between PE 1 and CE 1 belongs. The second ESI is, for example, ESI 1, and the connection between PE 1 and CE 1 is, for example, AC 101. PE 1 can determine whether the first ESI is the same as the second ESI stored in PE 1. The Ethernet segment to which the connection between PE 1 and CE 1 belongs is ESI 1, and the Ethernet segment to which the connection between. PE 2 and CE 1 belongs is ESI 1. Therefore, PE 1 can determine that the first ESI is the same as the second ESI, which means that the connection between PE 1 and CE 1 and the connection between PE 1 and CE 1 belong to the same Ethernet segment, and CE 1 is multi-homed to PE 1 and PE 2.

S203. PE 1 generates a first entry in response to that the PE 1 device determines that the first ESI is the same as the second ESI, where the first entry includes the address of PE 2.

When PE 1 determines that the first ESI is the same as the second ESI. PE 1 generates the first entry, where the first entry includes the address of PE 2, and the address of PE 2 is included in the message sent by PE 2 to PE 1. The first entry may further include an identifier of the interface 104 used by PE 1 to connect to CE 1, where the identifier is used to query the interface 104. The first entry may be referred to as a multi-homed neighbor table. The first entry may further include ESI 1 for subsequent query.

It should be understood that, as previously described, to resolve the loop problem, before PE 1 and PE 2 start a normal data service. PE 1 and PE 2 send a routing message to each other. Therefore, based on the same procedure, a second entry can be generated on PE 2 with reference to S201-S203 accordingly, where the second entry includes the address of PE 1, for example, "1::100". The second entry may further include an identifier of the interface 105 used by PE 2 to connect to CE 1, where the identifier is used to query the interface 105. The second entry may be referred to as a multi-homed neighbor table. The second entry may further include ESI 1 for subsequent query.

S204, PE 2 sends a data packet to PE 1.

A source address of the data packet may be the address of PE 2, for example, an IPv6 address of PE 2. For example, the source address is an address used by PE 2 for establishing a BGP peer relationship with PE 1, which is referred to as an address of PE 2 for establishing neighbor relationship. The data packet sent by PE 2 to PE 1 may be a data packet to be sent to CE 1 that is sent by PE 3 and that is received by PE 2. When PE 2 receives the data packet to be sent to CE 1 that is sent by PE 3, PE 2 can determine, through parsing, that the destination address of the data packet is "2::1".

Optionally, after receiving the data packet sent by PE 3, PE 2 can determine whether the local interface 105 is faulty. When the local interface 105 is not faulty. PE 2 may send the data packet to CE 1 through the local interface 105. When the local interface 105 is faulty, PE 2 may send the data packet to PE 1 through the non-local interface 108, to attempt to send the data packet to CF 1 through PE 1. For example, after receiving the data packet sent by PE 3, PE 2 performs operations associated with the SID value "2::1" associated with the EVPL, including: determining an entry y2 associated with the SID value "2::1", where the entry y2 includes the SID value "2::1" and all interfaces on PE 2 that can be used to send the data packet to CE 1; and determining, based on the entry y2, that the local interface 105 of PE 2 is faulty. PE 2 may send the data packet to be sent to CE 1 to PE 1 through the interface 108 by using the value "1::1" associated with the EVPL on PE 1 as the destination address of the data packet, to attempt to trigger PE 1 to forward the data packet to the local interface 104 to implement FRR. PE 2 sets the source address of the data packet to be the address of PE 2, for example, the neighbor establishment address of PE 2, for example, "2::100".

Optionally, after receiving the data packet, PE 2 does not determine whether the local interface 105 of PE 2 is faulty, but instead sends the data packet to be sent to CE 1 to PE 1 directly through the interface 108 by using the value "1::1" associated with the EVPL on PE 1 as the destination address of the data packet, to attempt to trigger PE 1 to forward the data packet to the local interface 104 to implement FRR. The source address of the data packet may be "2::100", and, the destination address of the data packet may be "1::1".

S205. PE 1 receives the data packet sent by PE 2.

S206, PE 1 determines that the source address of the data packet is the same as the address of PE 2 in the first entry.

PE 1 receives the data packet sent by PE 2, obtains the source address "2::100" of the data packet, and determines whether the source address is the same as the address of PE 2 stored in the first entry. For example, PE 1 can determine that the source address "2::100" of the data packet is the same as the address "2::100" included in the first entry on PE 1.

S207. PE 1 avoids sending the data packet to PE 2 in response to that PE 1 determines that the source address of the data packet is the same as the address of PE 2 in the first entry.

When PE 1 determines that the source address of the data packet is the same as the address of PE 2 in the first entry, PE 1 avoids forwarding the data packet to be sent to CE 1 to PE 2; in other words. PE 1 avoids sending the data packet to the non-local interface 108, for example, PE 1 marks a data packet and filters out the marked data packet when PE 1 subsequently sends a plurality of data packets to the interface 108. Further; PE 1 may send the data packet to CE 1 through the main path to CE 1 that is stored on PE 1, namely, the local interface 104. If the local interface 104 is faulty, in other words, the main path is faulty, PE 1 discards the data packet.

Optionally, when the source address of the data packet is different from the address of PE 2 in the first entry, PE 1 performs the foregoing operations associated with the SID value "1::1" associated with the EVPL based on the destination address "1::1" of the data packet.

Therefore, in S204, if PE 2 determines that the local interface 105 is faulty, PE 2 forwards the data packet to PE 1. PE 1 can determine the state of the local interface 104 after receiving the data packet. When the local interface 104 is not faulty, PE 1 may send the data packet through the local interface 104 to complete forwarding. When the local interface 104 is faulty, PE 1 may avoid sending the data packet to PE 2. Specifically, PE 1 determines that the source address of the data packet is the same as the address of PE 2, and avoids sending the data packet to the interface 108, for example, PE 1 discards the data packet. Therefore, a continuous traffic loop between PE 1 and PE 2 is avoided when both the local interface 104 of PE 1 and the local interface 105 of PE 2 are faulty.

In the embodiment of this application, when PE 1 receives the data packet sent by PE 2, based on the first entry that includes the address of PE 2 and that is stored in PE 1 and the source address included in the data packet, PE 1 can avoid sending the data packet to PE 2, so that no traffic loop is formed, thereby avoiding waste of network resources, and avoiding affecting performance of the PE devices.

It should be understood that, in this application, a faulty interface may mean that the interface is faulty, for example, a function of the interface is abnormal; or may mean that an AC connected to the interface is faulty, for example, the AC is disconnected. The PE device may store interface status information. When the PE device detects that the interface is faulty, for example, a physical signal received by a physical port of the interface is interrupted or a bit error rate of the data packet received by the interface is greater than a threshold, the PE device may update the interface status information stored in the PE device, for example, mark that the interface is faulty. The PE device can determine whether a local interface or a non-local interface is faulty based on the stored interface status information. The foregoing manner in which the PE determines whether the interface is faulty is merely an example.

After PE 1 determines that the interface used by PE 1 to connect to CE 1 is faulty, PE 1 determines that the source address of the data packet is the same as the address of PE 2 in the first entry. If PE 1 determines that the interface used by PE 1 to connect to CE 1 is normal, in other words, the main path from PE 1 to CE 1 is not faulty, PE 1 may send the data packet through the interface used by PE 1 to connect to CE 1, and does not need to determine whether the source address of the data packet is the same as the address of PE 2 in the first entry. This may improve efficiency of sending the data packet by PE 1 during communication, and may further save network resources.

Figure 3:
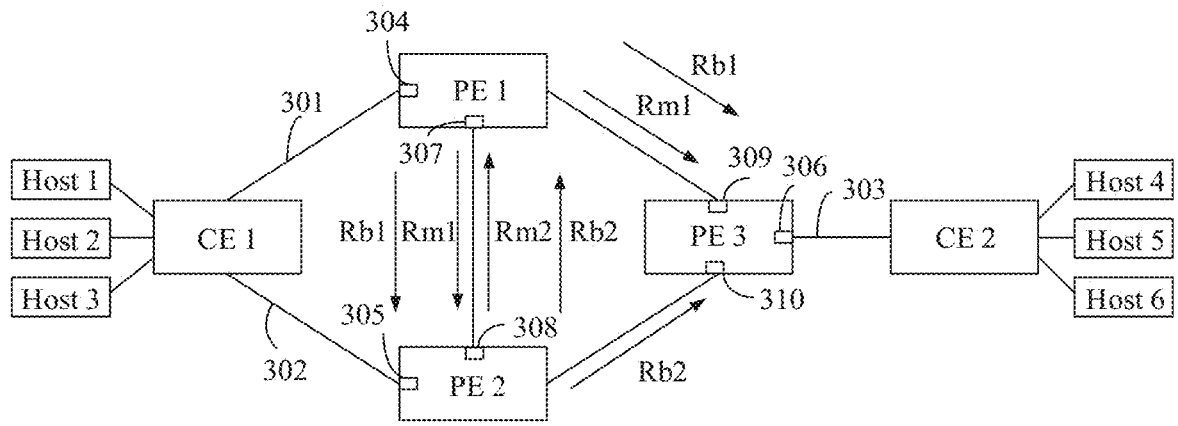
FIG. 3 is a schematic diagram of another SRv6 EVPN dual-active scenario according to an embodiment of this application.

FIG. 3 is a schematic diagram of another SRv6 EVPN dual-active scenario according to an embodiment of this application. The network shown in FIG. 3 may provide a unicast service in multipoint to multipoint (MP2MP) services. The network shown in FIG. 3 includes: a host 1, a host 2, a host 3, a host 4, a host 5, and a host 6; CE devices CE 1 and CE 2; and PE devices PE 1, PE 2, and PE 3. Host 1, host 2, and host 3 are connected to CE 1; host 4, host 5, and host 6 are connected to CE 2; PE 1, PE 2, and PE 3 are connected to CE 1, CE 1, and CE 3 through attachment circuits AC 301, AC 302, and AC 303, respectively; and PE 1, PE 2, and PE 3 are connected to AC 301, AC 302, and AC 303 through interfaces 304, 305, and 406, respectively. The interfaces 304, 305, and 306 are all local interfaces, and interfaces 307 and 308 are non-local interfaces. PE 1 is connected to PE 2 through the interface 307; PE 2 is connected to PE 1 through the interface 308; PE 3 is connected to PE 1 through an interface 309; and PE 3 is connected to PE 2 through an interface 310. AC 101 and AC 102 belong to the same Ethernet segment, and an identifier of the Ethernet segment may be "ESI 1". AC 103 belongs to another Ethernet segment, and an identifier of the another Ethernet segment may be "ESI 2". In an example, PE 1, PE 2, and PE 3 are configured as follows:

PE 2: An ESI attribute value of the interface 305 is "ESI 1". The interface 305 is associated with the processing module BD 2. The packet processing function on PE 2 may be implemented by BD 2. For example, a configuration process is as follows: An ESI attribute value of the interface 304 is "ESI 1", and an SID associated with the unicast service is "1::1". For example, a specific configuration process is as follows: The ESI attribute value of the interface 304 is configured to be "ESI 1", a processing module associated with the interface 304 is configured to be "BD 1", an SID associated with BD 1 is configured to be "1::1", and an SID associated with the processing module BD 1 used to process data related to the unicast service on PE 1 is configured to be "1::1", which is equivalent to configuring an SID associated with the unicast service on PE 1 to be "1::1".

For example, a specific configuration process is as follows: The ESI attribute value of the interface 305 is con-figured to be "ESI 1", a processing module associated with the interface 305 is configured to be "BD 2", an SID associated with BD 2 is configured to be "2::1", and an SID associated with the processing module BD 2 used to process data related to the unicast service on PE 2 is configured to be "2::1", which is equivalent to configuring an SID associated with the unicast service on PE 2 to be "2::1".

PE 3: An ESI attribute value of the interface 306 is "ESI 2". The interface 306 is associated with the processing module BD 3. The packet processing function on PE 3 may be implemented by BD 3. For example, a specific configuration process is as follows: The ESI attribute value of the interface 306 is configured to be "ESI 2", a processing module associated with the interface 306 is configured to be "BD 3", an SID associated with BD 3 is configured to be "3::1", and an SID associated with the processing module BD 3 used to process data related to the unicast service on PE 3 is configured to be "3::1", which is equivalent to configuring an SID associated with the unicast service on PE 3 to be "3::1".

In this scenario, to provide the unicast service and the dual-active mode, PE 1, PE 2, and PE 3 send routing messages to each other, where the routing messages may be BGP messages. Reference may be made to the IETF draft "EVPN All Active Usage Enhancement, draft-eastlake-bess-enhance-evpn-all-active-00.txt", which describes how one CE device in EVPN can be multi-homed to a plurality of PE devices and how a plurality of PE devices can be in all-active mode. The all-active mode may also be referred to as all-active redundancy mode.

Figure 4:
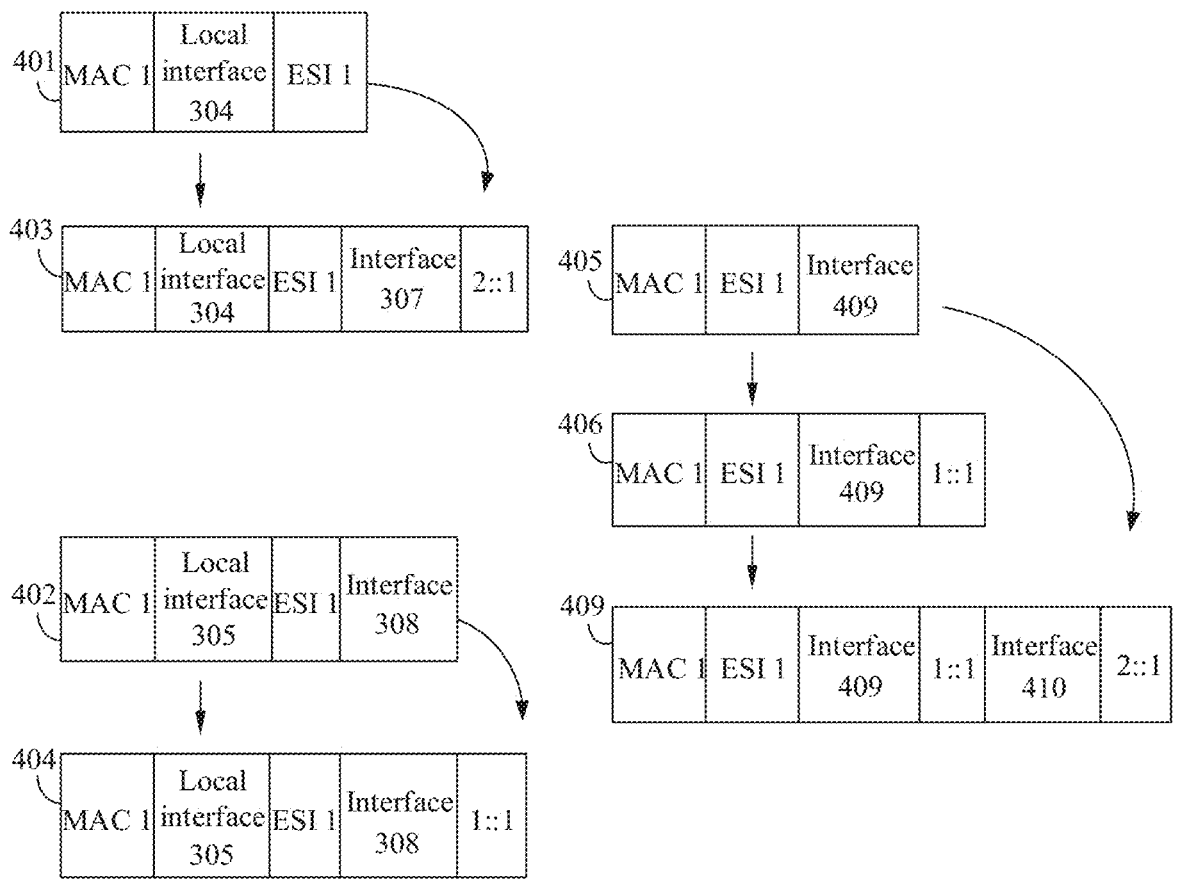
FIG. 4 is a schematic diagram of entries in a MAC forwarding table according to an embodiment of this application.

FIG. 4 is a schematic diagram of entries in a MAC forwarding table according to an embodiment of this application. PE 1, PE 2, and PE 3 may all store a MAC forwarding table. In an example, PE 1 may learn a MAC address MAC 1 of the host 1 from CE 1 through the local interface 304, and generate an entry 401 in a MAC forwarding table on PE 1, where the entry 401 includes MAC 1, an identifier of the local interface 304, and an ESI attribute value "ESI 1" of the local interface 304. PE 1 sends a routing message Rm1 to PE 2 and PE 3, where the routing message Rm1 includes an entry 401 and a virtual local area network redirection extension community "VLAN-Redirect-Extended Community" attribute described in the foregoing draft "EVPN All Active Usage Enhancement, draft-eastlake-bess-enhance-even-all-active-00.txt".

In an example, after receiving the routing message Rm1, PE 2 may find a local interface of PE 2, namely, the interface 305 used by PE 2 to connect to CE 1, based on ESI 1 in the entry 401, and generate a fast reroute (fast reroute, FRR) entry 402, namely, the entry 402 in the MAC forwarding table on PE 2. The entry 402 includes MAC 1, an identifier of the local interface 305 used to send the data packet to CE 1 through a main path, ESI 1, and an identifier of the interface 308 used to send the data packet to CE 1 through a repaired path. The main path on PE 2 is from PE 2 to CE 1 through the local interface 305, and the repaired path is from PE 2 to CE 1 through the interface 308 and PE 1. The repaired path is a path from PE 2 through PE 1 to CE 1. In this application, the repaired path may also be referred to as a standby (standby) path.

PE 2 may send a routing message Rb2 to PE 1 and PE 3, where the routing message Rb2 includes an AD route A2 and an SRv6-VPN SID attribute in which the type is "2". The AD route A2 includes an ESI field, and a value of the ESI field in the AD route A2 is the ESI attribute value ESI 1 of the interface 405 configured on PE 2. In the following scenario shown in FIG. 3, the value of the SRv6-VPN SID attribute in which type is "2" is referred to as a unicast attribute value. The unicast attribute value may be used to notify the peer device of the SID that is associated with the unicast service and that is configured on the local device. The unicast attribute value in the routing message Rb2 is the SID value "2::1" that is associated with the unicast service and that is configured on PE 2.

PE 1 receives, through the interface 307, the routing message Rb2 sent by PE 2, determines that ESI 1 in the routing message Rb2 is the same as ESI 1 in the entry 401 generated by PE 1, and PE 1 determines that PE 2 is a backup device of PE 1. Referring to FIG. 4, PE 1 generates an entry 403 based on the entry 401, the interface 307 receiving the routing message Rb2, and the unicast attribute value "2::1" in the routing message Rb2. The entry 403 includes MAC 1, an identifier of the local interface 304, ESI 1, an identifier of the interface 307, and "2::1".

Similarly, PE 1 may send a routing message Rb1 to PE 2 and PE 3, where the routing message Rb1 includes an AD route A1 and a unicast attribute, the AD route A1 includes an ESI field, a value of the ESI field in the AD route A1 is the ESI attribute value ESI 1 of the interface 304 configured on PE 1, and the unicast attribute value in the routing message Rb1 is the SID value "1::1" that is associated with the unicast service and that is configured on PE 1. PE 2 receives, through the interface 308, the routing message Rb1 sent by PE 1, determines that ESI 1 in the routing message Rb1 is the same as ESI 1 in the entry 402 generated by PE 2, and PE 2 determines that PE 1 is a backup device of PE 2. Referring to FIG. 3, PE 2 generates an entry 404 based on the entry 402 and the unicast attribute value "1::1" in the routing message Rb1. The entry 404 includes MAC 1, an identifier of the local interface 305, ESI 1, an identifier of the interface 308, and "1::1".

After receiving, through the interface 309, the routing message Rm1 sent by PE 1, PE 3 may generate an entry 405 in a MAC forwarding table on PE 3, where the entry 405 includes MAC 1, ESI 1, and an identifier of the interface 309.

After receiving, through the interface 309, the routing message Rb1 sent by PE 1, PE 3 can determine that the ESI in the routing message Rb1 is the same as the ESI in the entry 405 generated by PE 3, and may generate an entry 406 based on the entry 405 and the unicast attribute value "1::1" in the routing message Rb1. The entry 406 includes MAC 1, ESI 1, an identifier of the interface 309, and "1::1". After receiving, through the interface 310, the routing message Rb2 sent by PE 2, PE 3 can determine that the ESI in the routing message Rb2 is the same as the ESI in the entry 406, namely, the ESI in the routing message Rb1 received from PE 1. Therefore, PE 3 can determine that a local interface of PE 2 and a local interface of PE 1 belong to the same Ethernet segment, in other words, a connection between PE 2 and CE 1 and a connection between PE 1 and CE 1 belong to the same Ethernet segment. In other words, PE 3 can determine that PE 2 is a backup device of PE 1. PE 3 may generate an entry 409 based on the entry 506 and the unicast attribute value "2::1" in the routing message Rb2. The entry 409 includes MAC 1, ESI 1, an identifier of the interface 309, "1::1", an identifier of the interface 310, and "2::1". When PE 3 receives a data packet with a destination MAC address of "MAC 1" that is forwarded by CE 2, PE 3 may search the MAC forwarding table based on MAC 1, and choose to send the data packet to PE 1 or PE 2 based on the entry 409. PE 3 may set the destination address of the data packet to be "1::1", and send the data packet with the destination address of "1::1" to PE 1 through the interface 309, to trigger PE 1 to provide the unicast service, in other words, to trigger PE 1 to forward the data packet to CE 1. Alternatively, PE 3 may set the destination address of the data packet to be "2::1", and send the data packet with the destination address of "2::1" to PE 2 through the interface 310, to trigger PE 2 to provide the unicast service, in other words, to trigger PE 2 to forward the data packet to CE 1.

When PE 2 receives a data packet with a destination address of "2::1" and a destination MAC address of "MAC 1" that is forwarded by PE 3, PE 2 performs operations associated with the SID value "2::1". For the operations associated with the SID value in this scenario, reference may be made to the functions of End.DT2U described in section 4.6 of the IETF draft "SRv6 Network Programming, draft-filsfils-spring-srv6-network-programming-04". The functions of End.DT2U include forwarding a data packet through an interface in an entry matching a destination MAC address. According to the functions of End.DT2U, the operations associated with the SID value "2::1" on PE 2 include sending the data packet through the local interface 305 and the interface 308 in the entry 404 matching MAC 1. The operations associated with the SID value "1::1" on PE 1 include sending the data packet through the local interface 304 and the interface 307 in the entry 403 matching MAC 1. Referring to FIG. 4, the entry 404 includes the identifier of the local interface 305, the identifier of the interface 308, and "1::1". PE 2 first determines whether the local interface 305 is faulty. When the local interface 305 is not faulty, PE 2 sends the data packet to CE 1 through the local interface 305. When the local interface 305 is faulty, PE 2 sends the data packet with the destination address of "1::1" to PE 1 through the interface 308, to trigger PE 1 to forward the data packet to CE 1.

After PE 1 receives the data packet with a destination address of "1::1" and a destination MAC address of "MAC 1" that is sent by PE 2, PE 1 performs the operations associated with the SID value "1::1". The associated operations may include sending the data packet through the local interface 304 and the interface 307 in the entry 403 matching MAC 1. Referring to FIG. 4, the entry 403 includes an identifier of the local interface 304, an identifier of the interface 307, and "2::1". PE 1 first determines whether the local interface 304 is faulty. When the local interface 304 is not faulty, PE 1 sends the data packet to CE 1 through the local interface 304. When the local interface 304 is faulty, PE 1 sends the data packet with a destination address of "2::1" to PE 2 through the interface 307, to trigger PE 2 to forward the data packet to CE 1. Therefore, PE 1 sends the data packet sent from PE 2 back to PE 2. Consequently, a data packet transmission loop is formed. When PE 3 receives a route revocation notification, a new loop will not occur only when no new data packet is sent to PE 2. An existing loop can be removed only when PE 1 or PE 2 receives the route revocation notification and revokes the route to the peer device.

To resolve the loop problem, before PE 1 and PE 2 start a normal data service. PE 1 and PE 2 send a routing message to each other. The routing message may be a BGP message, and the BGP message may be the foregoing ES AD route, including an ESI field and an address of a provider edge device.

It should be understood that the ES AD route may be sent concurrently with an Ethernet auto-discovery route without an ESI label extended community attribute, or the ES AD route may be sent before or after an Ethernet auto-discovery route without an ESI label extended community attribute is sent.

Figure 5:
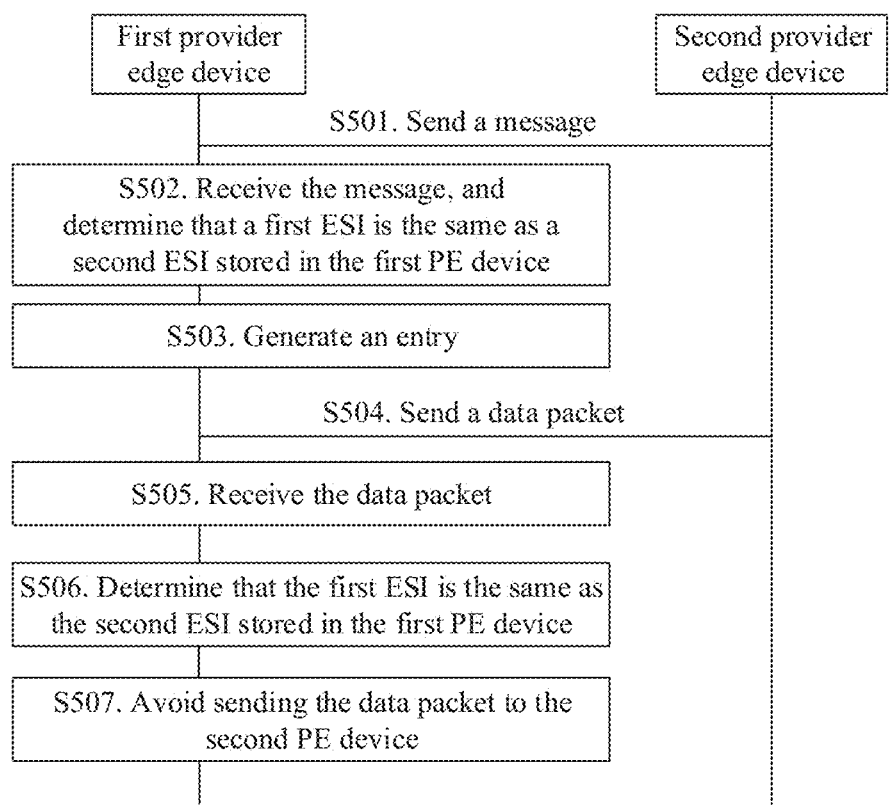
FIG. 5 is a schematic flowchart of a communication method according to this application.

A communication method 500 provided in this application is described in detail below with reference to FIG. 5. The method 500 may be applied to the scenario shown in FIG. 3, and certainly may also be applied to another communication scenario. This is not limited in this embodiment of this application. The method 500 includes the following steps:

S501. PE 2 sends a message to PE 1.

The message includes, for example, a first ESI and an address of PE 2. S501 is similar to S201, and reference may be made to the description of S201. The first ESI may identify an Ethernet segment to which a connection between PE 2 and CE 1 belongs. The first ESI is, for example, ESI 1; and the connection between PE 2 and CE 1 is, for example, AC 302. The Ethernet segment further includes a connection between PE 1 and CE 1, for example, AC 301.

S502. PE 1 receives the message sent by PE 2, and PE 1 determines that the first ESI is the same as a second ESI stored in PE 1.

The second ESI may identify an Ethernet segment to which a connection between PE 1 and CE 1 belongs. The second ESI is, for example, ESI 1. S502 is similar to S202, and reference may be made to the description of S202.

S503. PE 1 generates a first entry in response to that the PE 1 device determines that the first ESI is the same as the second ESI, where the first entry includes the address of PE 2.

S503 is similar to S203, and reference may be made to the description of S203.

S504. PE 2 sends a data packet to PE 1.

A source address of the data packet may be the address of PE 2, for example, an IPv6 address of PE 2. For example, the source address is an address used by PE 2 to establish a BGP peer relationship with PE 1. The data packet sent by PE 2 to PE 1 may be a data packet to be sent to CE 1 that is sent by PE 3 and that is received by PE 2. When PE 2 receives the data packet to be sent to CE 1 that is sent by PE 3, PE 2 can determine, through parsing, that the destination address of the data packet is 2::1 and the destination MAC address of the data packet is MAC 1.

Optionally, after receiving the data packet sent by PE 3, PE 2 can determine whether the local interface 105 is faulty. When the local interface 105 is not faulty, PE 2 may send the data packet to CE 1 through the local interface 105. When the local interface 105 is faulty, PE 2 may send the data packet to PE 1 through the non-local interface 108, to attempt to send the data packet to CE 1 through PE 1. For example, after PE 2 receives a data packet with a destination address of "2::1", PE 2 performs operations associated with the SID value "2::1", where the operations include sending the data packet through the local interface 305 and the interface 308 in the entry 404 matching MAC 1. The entry 404 includes the identifier of the local interface 305, the identifier of the interface 308, and "1::1". PE 2 determines that the local interface 305 is faulty, and sends a data packet with the destination address "1::1" to PE 1 through the interface 308, to attempt to trigger PE 1 to forward the data packet to CE 1. The source address of the data packet sent by PE 2 to PE 1 may be 2:100, the destination address may be "1::1", and the destination MAC address may be MAC 1.

Optionally, PE 2 does not determine that the local interface 305 is faulty after receiving the data packet, but instead sends the data packet to PE 1 directly through the interface 308 based on the interface identifier of the interface 308 in the entry 404, to trigger PE 1 to forward the data packet to CE 1. The source address of the data packet sent by PE 2 to PE 1 may be 2::100, the destination address may be "1::1", and the destination MAC address may be MAC 1.

S505. PE 1 receives the data packet sent by PE 2.

S506. PE 1 determines that the source address of the data packet is the same as the address of PE 2 in the first entry.

PE 1 receives the data packet sent by PE 2, obtains the source address "2::100" of the data packet, and determines whether the source address is the same as the address of PE 2 stored in the first entry. For example, PE 1 can determine that the source address "2::100" of the data packet is the same as the address "2::100" included in the first entry on PE 1.

S507. PE 1 avoids sending the data packet to PE 2 in response to that PE 1 determines that the source address of the data packet is the same as the address of PE 2 in the first entry.

When PE 1 determines that the source address of the data packet is the same as the address of PE 2 in the first entry, PE 1 avoids forwarding the data packet to be sent to CE 1 to PE 2; in other words, PE 1 avoids sending the data packet to the non-local interface 308, for example, PE 1 marks a data packet and filters out the marked data packet when PE 1 subsequently sends a plurality of data packets to the interface 308. Further, when PE 1 determines that the local interface 304 is not faulty based on the identifier of the local interface 304 in the entry 403 matching the destination MAC address MAC 1, PE 1 may send the data packet to CE 1 through the local interface 304. If the local interface 304 is faulty, PE 1 discards the data packet.

Optionally, when the source address of the data packet is different from the address of PE 2 in the first entry, PE 1 performs operations associated with the SID value based on the destination address "1::1" of the data packet, including: PE 1 first determines whether the local interface 304 is faulty; when the local interface 304 is not faulty, PE 1 sends the data packet to CE 1 through the local interface 304; and when the local interface 304 is faulty, PE sends the data packet with the destination address of "2::1" to PE 2 through the interface 307, to trigger PE 2 to forward the data packet to CE 1.

Therefore, in S504, if PE 2 determines that the local interface 305 is faulty, PE 2 forwards the data packet to PE 1. PE 1 can determine the state of the local interface 304 after receiving the data packet. When the local interface 304 is not faulty, PE 1 may send the data packet through the local interface 304 to complete forwarding. When the local interface 304 is faulty, PE 1 can avoid sending the data packet to PE 2. Specifically, PE 1 determines that the source address of the data packet is the same as the address of PE 2, and avoids sending the data packet to the interface 308, for example, PE 1 discards the data packet. Therefore, a continuous traffic loop between PE 1 and PE 2 is avoided when both the local interface 304 of PE 1 and the local interface 305 of PE 2 are faulty.

In the embodiment of this application, when PE 1 receives the data packet sent by PE 2, based on the first entry that includes the address of the second PE device and that is stored in PE 1 and the source address included in the data packet, PE 1 can avoid sending the data packet to PE 2, so that no traffic loop is formed, thereby avoiding waste of network resources, and avoiding affecting performance of the PE devices.

Figure 6:
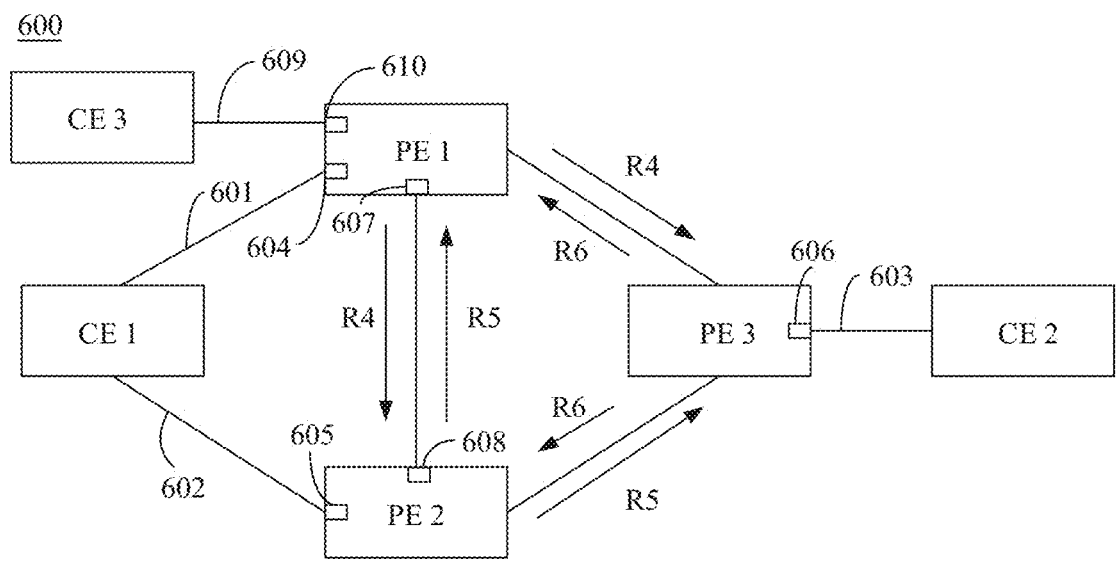
FIG. 6 is a schematic diagram of another SRv6 EVPN dual-active scenario according to an embodiment of this application.

FIG. 6 is a schematic diagram of another SRv6 EVPN dual-active scenario according to an embodiment of this application. The network shown in FIG. 6 may provide broadcast, unknown unicast and multicast (broadcast, unknown unicast and multicast, BUM) traffic forwarding in multipoint tai multipoint (multipoint to multipoint, MP2MP) services. The network shown in FIG. 6 includes CE devices CE 1, CE 2, and CE 3, and PE devices PE 1, PE 2, and PE 3.

PE 1, PE 2, and PE 3 are connected to CE 1, CE 1, and CE 2 through attachment circuits AC 601, AC 602, and AC 603, respectively; and PE 1 is connected to CE 3 through an attachment circuit AC 609. PE 1, PE 2, and PE 3 are connected to AC 601, AC 602, and AC 603 through interfaces 604, 605, and 606, respectively; and PE 1 is connected to an AC 609 through an interface 610. The interfaces 604, 605, 606, and 610 are all local interfaces, and the interfaces 607 and 608 are non-local interfaces, PE 1 is connected to PE 2 through the interface 607, and PE 2 is connected to PE 1 through the interface 608. AC 601 and AC 602 belong to a first Ethernet segment, and an identifier of the first Ethernet segment may be "EST 1". AC 603 belongs to a second Ethernet segment, and an identifier of the second Ethernet segment may be "ESI 2", AC 609 belongs to a third Ethernet segment, and an identifier of the third Ethernet segment may be "ESI 3". In an example, PE 1, PE 2, and PE 3 are configured as follows:

PE 1: An ESI attribute value of the interface 604 is "EST 1", and an STD associated with the BUM service is "1::3". For example, a specific configuration process is as follows: The ESI attribute value of the interface 604 is configured to be "ESI 1", a processing module associated with the interface 604 is configured to be "BUM 1", and the SID associated with the BUM 1 is "1::3", and an SID associated with the processing module BUM 1 used to process data related to the BUM service on PE 1 is configured to be "1::3", which is equivalent to configuring an SID associated with the BUM service on PE 1 to be "1::3". In addition, an ESI attribute value of the interface 610 is "ESI 3", and a processing module associated with the interface 610 may be "BUM 3".

PE 2: An ESI attribute value of the interface 605 is "ESI 1". The interface 605 is associated with the processing module BUM 2. The packet processing, function on PE 2 may be implemented by BUM 2. For example, a specific configuration process is as follows: The ESI attribute value of the interface 605 is configured to be "ESI 1", a processing module associated with the interface 605 is configured to be "BUM 2", an SID associated with BUM 2 is configured to be "2::3", and an SID associated with the processing module BUM 2 used to process data related to the unicast service on PE 2 is configured to be "2::3", which is equivalent to configuring an SID associated with the unicast service on PE 2 to be "2::3".

PE 3: An ESI attribute value of the interface 606 is "ESI 2". The interface 606 is associated with the processing module BUM 3. The packet processing function on PE 3 may be implemented by BUM 3. For example, a specific configuration process is as follows: The ESI attribute value of the interface 606 is configured to be "ESI 2", a processing module associated with the interface 606 is configured to be "BUM 3", an SID associated with BUM 3 is configured to be "3::3", and an SID associated with the processing module BUM 3 used to process data related to the unicast service on PE 3 is configured to be "3::3", which is equivalent to configuring an SID associated with the unicast service on PE 3 to be "3::3".

In this scenario, to provide the BUM service and the dual-active mode, PE 1, PE 2, and PE 3 send routing messages to each other, where the routing messages may be BGP messages. The BGP message may include an inclusive multicast Ethernet tag route (Inclusive Multicast Ethernet Tag Route, IMET) and an SRv6-VPN SID attribute. In the following scenario shown in FIG. 6, the value of the SRv6-VPN SID attribute in which type is "2" is referred to as a BUM attribute value. The BUM attribute value may be used to notify the peer device of the SID that is associated with the BUM service and that is configured on the local device.

In an example, PE 1 generates an IMET route I1, and PE 1 sends a routing message R4 carrying I1 and a BUM attribute value to PE 2 and PE 3, where the BUM attribute value is "1::3", and the BUM attribute value can be used to notify PE 2 and PE 3 that the SID value associated with the BUM on PE 1 is "1::3". Similarly, PE 2 generates an IMET route I2, and PE 2 sends a routing message R5 carrying I2 and a BUM attribute value to PE 1 and PE 3, where the BUM attribute value is "2::3". PE 3 generates an MET route I3, and PE 3 sends a routing message R6 carrying I3 and a BUM attribute value to PE 1 and PE 2, where the BUM attribute value is "3::3".

After receiving the routing message R5 sent by PE 2, PE 1 establishes an entry t1, where the entry t1 includes the SID "2::3". After receiving the routing message R6 sent by PE 3, PE 1 adds the SID "3::3" to the entry t1. When PE 1 receives the data packet sent by CE 1, PE 1 may forward the data packet to PE 2 and PE 3. The entry t1 is used to forward a data packet when BUM traffic is forwarded, and may also be referred to as a BUM forwarding table. The data packet used when the BUM traffic is forwarded may also be referred to as a BUM packet. Similarly, entries t2 and t3 are established on PE 2 and PE 3, respectively, where the entry t2 on PE 2 includes SID "1::3" and SID "3::3", and the entry t3 on PE 3 includes SID "1::3" and SID "2::3".

It should be understood that, in this scenario, the network may provide a unicast service in multipoint-to-multipoint services; in other words, both a processing module BD used to process data related to the unicast service and a processing module BUM used to process data related to the BUM service may be provided on the PE device. For a detailed configuration process of the processing module BD used to process data related to the unicast service, reference may be made to the related descriptions of FIG. 4 and FIG. 5. Details are not described herein again.

Characteristics of BUM traffic forwarding are as follows: When a PE device receives BUM traffic sent by another PE device from a non-local interface, the PE device may send the BMU traffic to all local interfaces; and when the PE device receives BUM traffic sent by a CE device from a local interface, the PE device may forward the BUM traffic to all the other local interfaces and all non-local interfaces.

In the foregoing scenario, when PE 1 and PE 2 determine forwarding of the data packet based on the routing message sent by the peer device, it is assumed that PE 1 and PE 2 determine forwarding of the data packet based on the BUM attribute value, namely, the value associated with the BUM on the peer device.

Then, when PE 2 receives, from the local interface 602, a data packet sent by CE 1, PE 2 performs operations associated with the SID value "2::3" associated with the BUM, including: determining the entry t2 associated with the SID value "2::3"; determining the forwarding destination address SID value "1::3" and the SID value "3::3" of the data packet based on the entry t2; and PE 2 sends the data packet to PE 1 and PE 3 by using the values "1::3" and "3::3" associated with the BUM on PE 2 as the destination address of the data packet, respectively. After PE 1 receives, from the non-local interface 607, the data packet sent by PE 2, PE 1 sends the data packet to the local interfaces 607 and

610, namely, the CE devices CE 1 and CE 3; in other words, PE 1 sends the data packet sent by CE 1 back to CE 1. Consequently, a data packet transmission loop is formed. The loop problem may cause waste of network resources and affect performance of the CE devices.

To resolve the loop problem, before PE 1 and PE 2 start a normal data service, PE 1 and PE 2 send a routing message to each other. The routing message may be a BGP message, and the BGP message may be the foregoing ES AD route, including an ESI field and an address of a provider edge device.

It should be understood that the ES AD route may be sent concurrently with an Ethernet auto-discovery route without an ESI label extended community attribute, or the ES AD route may be sent before or after an Ethernet auto-discovery route without an ESI label extended community attribute is sent.

Figure 7:
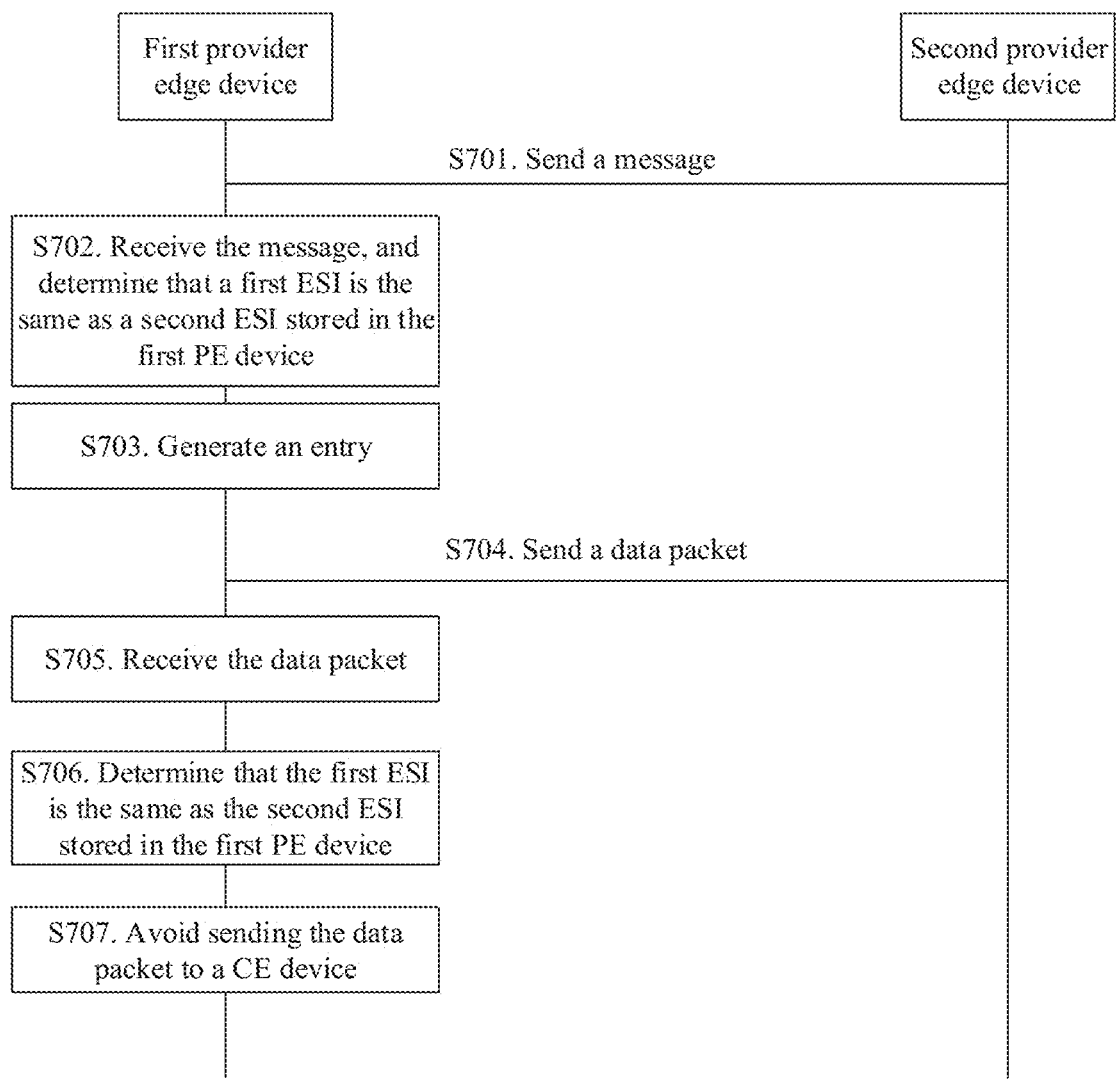
FIG. 7 is a schematic flowchart of a communication method according to this application.

A communication method 700 provided in this application is described in detail below with reference to FIG. 7. The method 700 may be applied to the scenario shown in FIG. 7, and certainly may also be applied to another communication scenario. This is not limited in this embodiment of this application. The method 700 includes the following steps:

S701. PE 2 sends a message to PE 1.

The message includes, for example, a first ESI and an address of PE 2. S701 is similar to S201, and reference may be made to the description of S201.

S702. PE 1 receives the message sent by PE 2, and PE 1 determines that the first ESI is the same as a second ESI stored in PE 1.

The second ESI may identify an Ethernet segment to which a connection between PE 1 and CE 1 belongs. The second ESI is, for example, ESI 1. S702 is similar to S202, and reference may be made to the description of S202.

S703. PE 1 generates a first entry in response to that the PE 1 device determines that the first ESI is the same as the second ESI, where the first entry includes the address of PE 2.

S703 is similar to S203, and reference may be made to the description of S203.

It should be understood that the message does not include ESI 3, and therefore PE 1 does not establish a third entry including ESI 3.

S704. PE 2 sends a data packet to PE 1.

The source address of the data packet may be the address of PE 2, for example, an address used by PE 2 to establish a BGP peer relationship with PE 1. The data packet sent by PE 2 to PE1 may be a data packet sent by CE 1 that is received by PE 2. When PE 2 receives a BUM packet sent by CE 1, PE 2 performs operations associated with the SID value "2::3" associated with the BUM, including: determining an entry t2 associated with the SID value "2::3", where the entry t2 includes SID "1::3" and SID "3::3"; and PE 2 forwards the data packet to PE 1 and PE 3 based on the SIDs in the entry t2. The source address of the data packet forwarded by PE 2 to PE 1 is "2::100", and the destination address is "1::3"; and the source address of the data packet forwarded by PE 2 to PE 3 is "2::100", and the destination address is "3::3".

S705. PE 1 receives the data packet sent by PE 2.

S706. PE 1 determines that the source address of the data packet is the same as the address of PE 2 in the first entry.

When PE 1 receives the data packet sent by PE 2 and obtains the source address "2::100" of the data packet, PE 1 can determine whether the source address is the same as the address of PE 2 stored in the first entry. For example, PE 1 can determine that the source address "2::100" of the data packet is the same as the address "2::100" included in the first entry on PE 1.

S707. PE 1 avoids sending the data packet to PE 2 in response to that PE 1 determines that the source address of the data packet is the same as the address of PE 2 in the first entry.

When PE 1 determines that the source address of the data packet is the same as the address of PE 2 in the first entry, PE 1 avoids sending the data packet to CE 1; in other words, PE 1 avoids sending the data packet to the local interface 604, for example, PE 1 marks a data packet and filters out the marked data packet when PE 1 subsequently sends a plurality of data packets to the interface 604. Further, PE 1 may still forward the data packet to the interface 610, namely CE 3. In other words, forwarding of BUM traffic of another Ethernet segment may not be affected while the loop of the Ethernet segment identified by ESI 1 is blocked, so that a traffic loop is avoided.

Optionally, when the source address of the data packet is different from the address of PE 2 in the first entry, PE 1 performs operations associated with the SID value "1::3", including: sending the data packet to all local interfaces such as the interface 604 and the interface 610.

In this embodiment of this application, when receiving the BUM packet, PE 1 can determine that the source address of the BUM packet is the same as the address of PE 2 in the entry based on the entry that includes the address of PE 2 and that is stored in PE 1 and the source address of the BUM packet, and avoid sending the BUM packet to CE 1, so that no traffic loop is formed, thereby avoiding waste of network resources, and avoiding affecting performance of the CE devices.

Optionally, PE 1 stores interface information, where the interface information may include an interface identifier used to identify a local interface and an ESI attribute value of the local interface. The interface identifier corresponds to the ESI attribute value, so that the interface identifier may be found based on the ESI attribute value. The second ESI stored in PE 1 may be air ESI attribute value in the interface information. For example, the interface identifier of the local interface is, for example, the identifier of the interface 604, and the second ESI stored in PE 1 is, for example, the ESI attribute value "ESI 1" of the interface 604. After PE 1 determines that the first ESI in the message sent by PE 2 is the same as the second ESI stored in PE 1, PE 1 may find the corresponding interface identifier, namely, the interface identifier of the interface 604, in the interface information based on the value "ESI 1" of the second ESI. Therefore, the first entry generated by PE 1 may include the interface identifier in addition to the address of PE 2. After receiving the data packet whose source address is the address of PE 2, PE, 1 may search the first entry based on the source address of the data packet, determine the interface identifier of the interface 604, and then avoid sending the data packet to the interface 604 identified by the interface identifier. The first entry generated by PE 1 stores a correspondence between the address of PE 2 and the identifier of the interface 604. PE 1 does not store the correspondence between the address of PE 2 and the identifier of the interface 610. Therefore, PE 1 can still forward the data packet to the interface 610, namely, CE 3. In other words, forwarding of the BUM traffic of another Ethernet segment (for example, an Ethernet segment identified by ESI 3) may not be affected while the loop of the Ethernet segment identified by EST 1 is blocked. The first entry may further include an Ethernet segment identifier ESI 1 for query.

Figure 8:
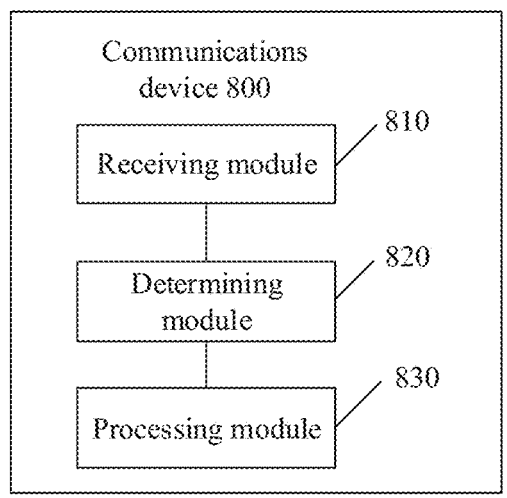
FIG. 8 is a schematic block diagram of a communications device according to this application.

FIG. 8 is a schematic block diagram of a communications device 800 according to this application. As shown in FIG. 8, the communications device 800 includes the following modules:

a receiving module 810, configured to receive a message sent by a second PE device, where the message includes a first Ethernet segment identifier ESI and an address of the second PE device, and the first ESI is used to identify an Ethernet segment to which a connection between the second PE device and a customer edge CE device belongs;

a determining module 820, configured to determine that the first ESI is the same as a second EST stored in the first PE device, the second ESI is used to identify an Ethernet segment to which a connection between the first PE device and the CE device belongs; and a processing module 830, configured to generate an entry in response to determining that the first ESI is the same as the second ESI, where the entry includes the address of the second. PE device; where the receiving module 810 is further configured to receive a data packet sent by the second PE device;

the determining module 820 is further configured to determine that a source address of the data packet is the same as the address of the second PE device in the entry; and the processing module 830 is further configured to avoid sending the data packet to the second PE device in response to determining that the source address of the data packet is the same as the address of the second PE device in the entry.

Optionally, the receiving module 810, the determining module 820, and the processing module 830 are configured to perform the operations of the communication method 200, the communication method 500, and the communication method 700 in this application. For brevity, details are not described herein.

The communications device 800 completely corresponds to PE 1 in the method embodiments, and corresponding modules perform corresponding steps. For details, reference may be made to corresponding method embodiments.

Figure 9:
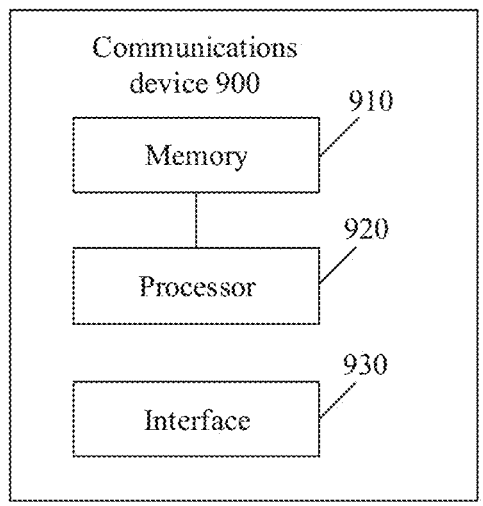
FIG. 9 is a schematic block diagram of a communications device according to this application.

FIG. 9 is a schematic block diagram of a communications device 900 according to this application. As shown in FIG. 9, the communications device 900 includes:

a memory 910, configured to store a second Ethernet segment identifier ESI, where the second ESI is used to identify an Ethernet segment to winch a connection between the first PE device and a customer edge CE device belongs; and a processor 920, configured to receive a message sent by a second PE device, where the message includes a first Ethernet segment identifier ESI and an address of the second PE device, and the first ESI is used to identify an Ethernet segment to which a connection between the second PE device and the CE device belongs; where the processor 920 is further configured to determine that the first ESI is the same as the second ESI;

the processor 920 is further configured to generate an entry in response to determining that the first ESI is the same as the second ESI, where the entry includes the address of the second PE device;

the processor 920 is further configured to receive a data packet sent by the second PE device;

the processor 920 is further configured to determine that a source address of the data packet is the same as the address of the second PE device in the entry; and the processor 920 is further configured to avoid sending the data packet to the second PE device in response to determining that the source address of the data packet is the same as the address of the second PE device in the entry.

The communications device 900, the second PE device, and the CE device may be PE 1, PE 2, and CE 1 in the communication method 200, the communication method 500, or the communication method 700 in this application, respectively. A value of the first ESI is, for example, ESI 1; and the entry is, for example, the first entry. The communications device 900 completely corresponds to PE 1 in the method embodiments, and corresponding modules perform corresponding steps. For details, reference may be made to corresponding method embodiments.

Optionally, the communications device 900 further includes an interface 930, where the interface 930 is configured to connect to the CE device; and the processor 920 is further configured to: before determining that the source address of the data packet is the same as the address of the second PE device, determine that the interface 930 is faulty.

The interface 930 may be the local interface 104, the local interface 304, and the local interface 604 used by PE 1 to connect to CE 1 in the communication method 200, the communication method 500, or the communication method 700 in this application, respectively.

When the processor 920 receives a data packet sent by the second PE device (namely, PE 2), after the processor 920 determines that the interface 930 is faulty, if the data packet is sent to CE 1 through the second PE device, a loop may be formed. Therefore, the processor 920 determines whether the source address of the data packet is the same as the address of the second PE device, so that no loop is formed.

Optionally, if the processor 920 determines that the interface 930 is normal, the first PE device may send the data packet through the interface 930. In this case, no traffic loop is formed, and the first PE device does not need to determine whether the source address of the data packet is the same as the address of the second PE device.

It should be understood that the communications device may include a plurality of interfaces in addition to the interface 930 used to connect to the CE device, where the plurality of interfaces are used to connect to other PE devices or CE devices.

Optionally, the processor 920 is further configured to avoid sending the data packet to the CE device in response to determining that the source address of the data packet is the same as the address of the second PE device in the entry.

Related functions of the communications device 900 may be understood with reference to the method 700 in the method embodiments. The method 700 is mainly used to resolve the loop problem that may occur when BUM traffic is forwarded. In addition, a processing module BD used to process unicast service related data may also be provided on the communications device 900.

The entry may be a first entry, the first entry may include the address of PE 2, and the address of PE 2 is included in a message sent by PE 2 to PE 1. The first entry may be referred to as a multi-homed neighbor table. The first entry may further include ESI 1 for subsequent query.

Optionally, the memory 910 stores interface information, and the second ESI stored in the memory is included in the interface information, the interface information further includes an interface identifier, where the interface identifier is used to identify an interface used by the first PE device to connect to the CE device; and the entry further includes the interface identifier.

The processor 920 is specifically configured to determine the interface identifier in the interface information based on the second ESI, to generate the entry.

The processor 920 is specifically configured to:

determine an interface identifier in the entry based on the entry and the source address of the data packet; and avoid sending the data packet to the interface that is used by the first PE device to connect to the CE device and that is identified by the interface identifier.

The interface information may be information about a plurality of interfaces on the communications device, such as information about a local interface and information about a non-local interface. The interface information may be used to record whether the interface is faulty. The interface information includes an interface identifier used to identify an interface used by the communications device 900 to connect to the CE device, for example, an identifier of an interface 604 used by PE 1 to connect to CE 1.

When the processor 920 generates the first entry in response to determining that the first ESI is the same as the second ESI, the first entry includes not only the address of the second PE device, but also the identifier of the interface 604 used by PE 1 to connect to CE 1, where the identifier is used to query the interface 604. When receiving a data packet sent by PE 2, the processor 920 determines an interface identifier, for example, an interface 604, in the first entry based on the first entry and a source address of the data packet; and the processor avoids sending the data packet to the interface 604. For example, a data packet is marked, and the marked data packet is filtered out when PE 1 subsequently sends a plurality of data packets to the interface 604.

Optionally, when the source address of the data packet is different from the address of PE 2 in the first entry, the processor 920 sends the data packet to all local interfaces. For example, the processor 920 sends the data packet to the interface 604 and the interface 610.

Optionally, the communications device 900 is applied to an Ethernet Virtual Private Network EVPN that is based on Internet Protocol version 6 segment routing SRv6, and the message is an Ethernet auto-discovery route with an ESI label extended community attribute.

Figure 10:
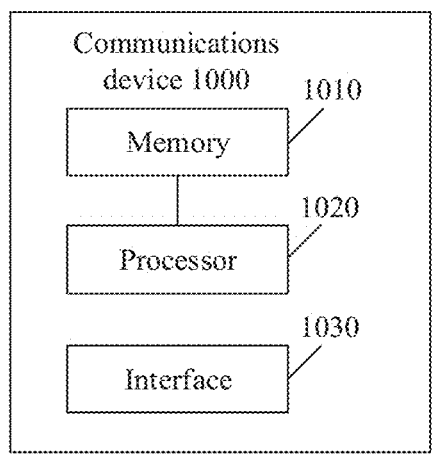
FIG. 10 is a schematic block diagram of a communications device according to this application.

FIG. 10 is a schematic block diagram of a communications device 1000 according to this application. The communications device 1000 includes:

a memory 1010, configured to store a program, where the program includes code; and a processor 1020, configured to execute the program code in the memory 1010; and an interface 1030, configured to communicate with another device.

Optionally, when the code is executed, the processor 1020 can implement various operations of PE 1 in the method 200, the method 500, and the method 700. For brevity, details are not described herein.

The interface 1030 is driven by the processor 1020 to send signals to or receive signals from another device. Interface information may be stored in the memory 1010 or in another memory in the communications device.

The interface 1030 is a generic term for an interface, and may include local interface or may include a non-local interface.

Figure 11:
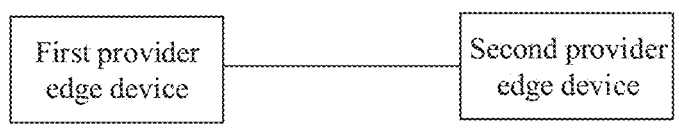
FIG. 11 is a schematic block diagram of a communications system according to an embodiment of this application.

FIG. 11 is a schematic block diagram of a communications system 1100 according to an embodiment of this application. As shown in FIG. 11, the communications system 1100 includes PE 1 and PE 2. The communications system 1100 may further include another PE device and a CE device connected to the another PE device. The communications system 1100 may be the foregoing SRv6 EVPN dual-active communications system, and may provide a virtual private wire service VPWS, a unicast service in multipoint-to-multipoint MP2MP services, and a BUM traffic forwarding service in the multipoint-to-multipoint MP2MP services.

The foregoing PE 1 and PE 2 completely correspond to PE 1 and PE 2 in the method embodiments such as the method 200, the method 500, and the method 700, and corresponding modules perform corresponding steps. For details, reference may be made to corresponding method embodiments.

It should be understood that the communications system 1100 may further include another network element or communications device. This is not limited in this embodiment of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The embodiments of this application may be mutually referenced, and the same or similar steps and terms are not described again.

All or some of the embodiments of this application may be implemented by software, hardware, firmware, or any combination thereof. When software is used to implement the embodiments, the embodiments may be implemented completely or partially in a form of a computer program product. The computer program product includes one or more computer program instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid-state drive), or the like.

What is claimed is:

1. A communication method, comprising:
receiving a data packet from a second provider edge (PE) device, wherein a source address of the data packet is the same as an address of the second PE in an entry stored in a first PE device, wherein a customer edge (CE) device is multi-homed to the first PE device and the second PE device in an all-active mode, and wherein the CE device is connected to the first PE device through a first connection and the second PE device through a second connection, the first connection and the second connection belonging to a same Ethernet segment; and
avoiding sending the data packet to the second PE device in response to determining that the source address of the data packet is the same as the address of the second PE device in the entry.

2. The method according to claim 1, further comprising:
before receiving the data packet, receiving a message from the second PE device, wherein the message comprises a first Ethernet segment identifier (ESI) and the address of the second PE device, and the first ESI is useable to identify the Ethernet segment; and
before receiving the data packet, generating the entry in response to determining that the first ESI is the same as a second ESI, stored in the first PE device, useable to identify the Ethernet segment.

3. The method according to claim 1, further comprising:
after receiving the data packet, determining that an interface useable by the first PE device to connect to the CE device is faulty.

4. The method according to claim 1, further comprising:
avoiding sending the data packet to the CE device in response to determining that the source address of the data packet is the same as the address of the second PE device in the entry.

5. The method according to claim 2, wherein the first PE device stores interface information, the interface information includes the second ESI stored in the first PE device, and an interface identifier, the interface identifier is useable to identify an interface, the interface being useable by the first PE device to connect to the CE device, and the interface identifier being part of the entry.

6. The method according to claim 1, wherein the first PE device or the second PE device is deployed in an Ethernet virtual private network (EVPN) based on Internet Protocol version 6 segment routing (SRv6).

7. The method according to claim 2, wherein the message is an Ethernet auto-discovery route with an ESI label extended community attribute.

8. A communications device, comprising:
a non-transitory computer readable memory, comprising instructions;
a processor coupled to the non-transitory computer readable memory, the instructions executed by the processor cause the communications device to:
receive a data packet from a second provider edge (PE) device, wherein a source address of the data packet is the same as an address of the second PE in an entry stored in a first PE device, wherein a customer edge (CE) device is multi-homed to the first PE device and the second PE device in an all-active mode, and wherein the CE device is connected to the first PE device through a first connection and the second PE device through a second connection, the first connection and the second connection belonging to a same Ethernet segment; and
avoid sending the data packet to the second PE device in response to determining that the source address of the data packet is the same as the address of the second PE device in the entry.

9. The communications device according to claim 8, wherein the instructions executed by the processor further cause the device to:
receive a message from the second PE device, wherein the message comprises a first Ethernet segment identifier (ESI) and the address of the second PE device, and the first ESI is useable to identify the Ethernet segment; and
generate the entry in response to determining that the first ESI is the same as a second ESI, stored in the first PE device, useable to identify the Ethernet segment.

10. The communications device according to claim 8, wherein the instructions executed by the processor further cause the device to:
determine that an interface useable by the first PE device to connect to the CE device is faulty after the data packet is received.

11. The communications device according to claim 8, wherein the instructions executed by the processor further cause the device to:
avoid sending the data packet to the CE device in response to determining that the source address of the data packet is the same as the address of the second PE device in the entry.

12. The communications device according to claim 9, wherein the non-transitory computer readable memory stores interface information, the interface information includes the second ESI stored in the non-transitory computer readable memory, and an interface identifier, the interface identifier is useable to identify an interface, the interface being useable by the first PE device to connect to the CE device, and the interface identifier being part of the entry.

13. The communications device according to claim 8, wherein the communications device is deployed in an Ethernet virtual private network EVPN based on Internet Protocol version 6 segment routing (SRv6).

14. The communications device according to claim 9, wherein the message is an Ethernet auto-discovery route with an ESI label extended community attribute.

15. A non-transitory computer storage medium, wherein the non-transitory computer storage medium stores a program instruction, and when the instruction is executed by a communications device, the communications device is enabled to:
receive a data packet from a second provider edge (PE) device, wherein a source address of the data packet is the same as an address of the second PE in an entry stored in a first PE device, wherein a customer edge (CE) device is multi-homed to the first PE device and the second PE device in an all-active mode, and wherein the CE device is connected to the first PE device through a first connection and the second PE device through a second connection, the first connection and the second connection belonging to a same Ethernet segment; and avoid sending the data packet to the second PE device in response to determining that the source address of the data packet is the same as the address of the second PE device in the entry.

16. The non-transitory computer storage medium according to claim 15, wherein the communications device is further enabled to:
receive a message from the second PE device, wherein the message comprises a first Ethernet segment identifier (ESI) and the address of the second PE device, and the first ESI is useable to identify the Ethernet segment; and
generate the entry in response to determining that the first ESI is the same as a second ESI, stored in the first PE device, useable to identify the Ethernet segment.

17. The non-transitory computer storage medium according to claim 15, wherein the communications device is further enabled to:
avoid sending the data packet to the CE device in response to determining that the source address of the data packet is the same as the address of the second PE device in the entry.

18. The non-transitory computer storage medium according to claim 15, wherein the communications device is further enabled to:
store interface information, the interface information includes the second ESI stored in the first PE device, and an interface identifier, the interface identifier is useable to identify an interface, the interface being useable by the first PE device to connect to the CE device, the interface identifier being part of the entry.

19. The non-transitory computer storage medium according to claim 15, wherein the communications device is deployed in an Ethernet virtual private network (EVPN) that is based on Internet Protocol version 6 segment routing (SRv6).

20. The non-transitory computer storage medium according to claim 16, wherein the message is an Ethernet auto-discovery route with an ESI label extended community attribute.

* * * * *